(12) United States Patent
Wang et al.

(10) Patent No.: US 11,794,768 B2
(45) Date of Patent: Oct. 24, 2023

(54) SAFETY CONFIRMATION SUPPORT DEVICE, SAFETY CONFIRMATION SUPPORT METHOD, AND SAFETY CONFIRMATION SUPPORT PROGRAM

(71) Applicant: Panasonic Intellectual Property Management Co., Ltd., Osaka (JP)

(72) Inventors: Yongxiang Wang, Kanagawa Ken (JP); Masahito Oishi, Kanagawa Ken (JP); Shintaro Miike, Tokyo To (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/688,229

(22) Filed: Mar. 7, 2022

(65) Prior Publication Data

US 2022/0297713 A1   Sep. 22, 2022

(30) Foreign Application Priority Data

Mar. 16, 2021   (JP) .................................. 2021-042856

(51) Int. Cl.
*B60W 50/14*   (2020.01)
*B60W 30/095*  (2012.01)
(Continued)

(52) U.S. Cl.
CPC ........ *B60W 50/14* (2013.01); *B60W 30/0956* (2013.01); *B60W 40/08* (2013.01); *B60W 40/105* (2013.01); *B60W 2050/143* (2013.01); *B60W 2050/146* (2013.01); *B60W 2540/225* (2020.02); *B60W 2554/40* (2020.02)

(58) Field of Classification Search
CPC .. B60W 50/14; B60W 30/0956; B60W 40/08; B60W 40/105; B60W 2050/143; B60W 2050/146; B60W 2540/225; B60W 2554/40
See application file for complete search history.

(56) References Cited

U.S. PATENT DOCUMENTS 9,493,072 B2   11/2016  Goto et al.
10,272,780 B2 *  4/2019  Yoshida ................. B60K 35/00
(Continued)

FOREIGN PATENT DOCUMENTS

JP         2015-232859        12/2015

*Primary Examiner* — Mohamed Barakat
(74) *Attorney, Agent, or Firm* — Greenblum & Bernstein, P.L.C.

(57) ABSTRACT

A safety confirmation support device (equipment system) according to the present disclosure contains hardware of storage unit and CPU processor and several sensing & display devices, and corresponding software including moving object detection unit, risk level detection unit, and output display control unit etc. The moving object detection unit is used to detect an object in a detection area around a vehicle. The risk level detection unit is used to determine, for each detected object, a risk level indicating a level of risk affecting the vehicle. The output display control unit is used to control output display information about the object via the one or more output devices when the risk level of the object is equal to or higher than a predetermined threshold value, and not to display the information about the object when the risk level is below the threshold value.

11 Claims, 17 Drawing Sheets

(51) Int. Cl.
  *B60W 40/08* (2012.01)
  *B60W 40/105* (2012.01)

(56) References Cited

U.S. PATENT DOCUMENTS

| | | | |
|---|---|---|---|
| 2015/0360565 A1* | 12/2015 | Goto | B60R 1/00 |
| | | | 701/36 |
| 2016/0063761 A1* | 3/2016 | Sisbot | G06T 19/006 |
| | | | 345/633 |
| 2016/0110618 A1* | 4/2016 | Oba | G06V 20/58 |
| | | | 348/148 |
| 2020/0189467 A1* | 6/2020 | Kondo | G06T 11/00 |
| 2021/0300401 A1* | 9/2021 | Hashimoto | G08G 1/166 |

\* cited by examiner

FIG.19
(a)
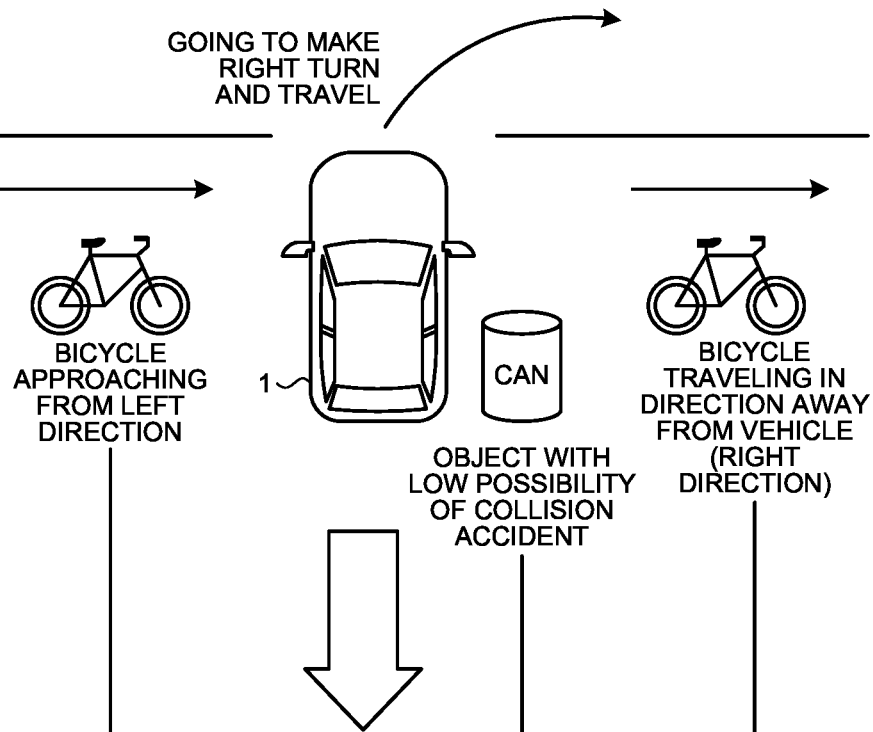
(b)
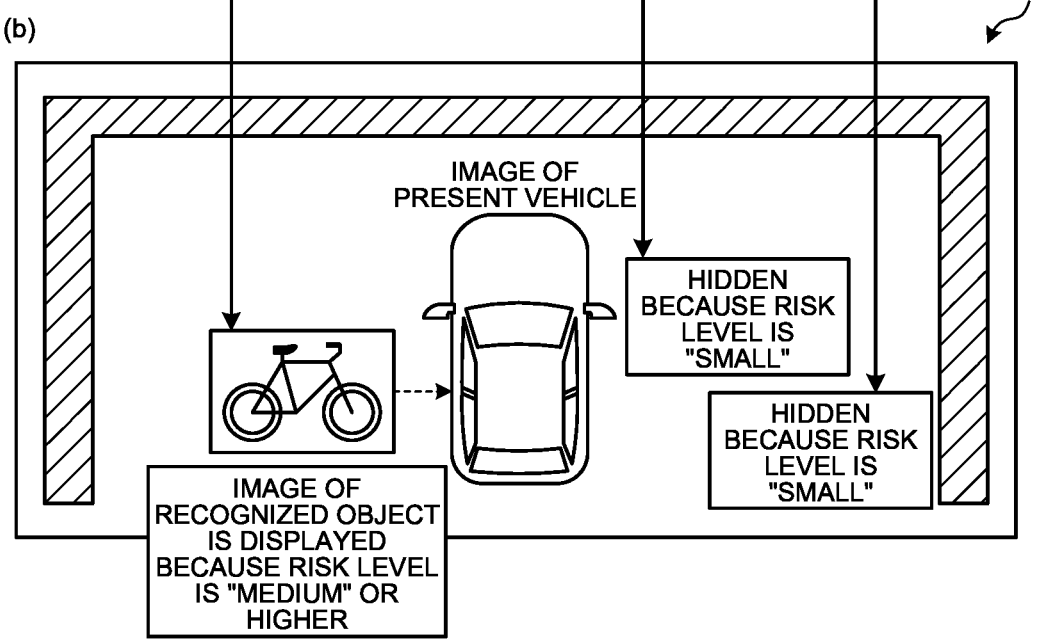

FIG.22
(a)
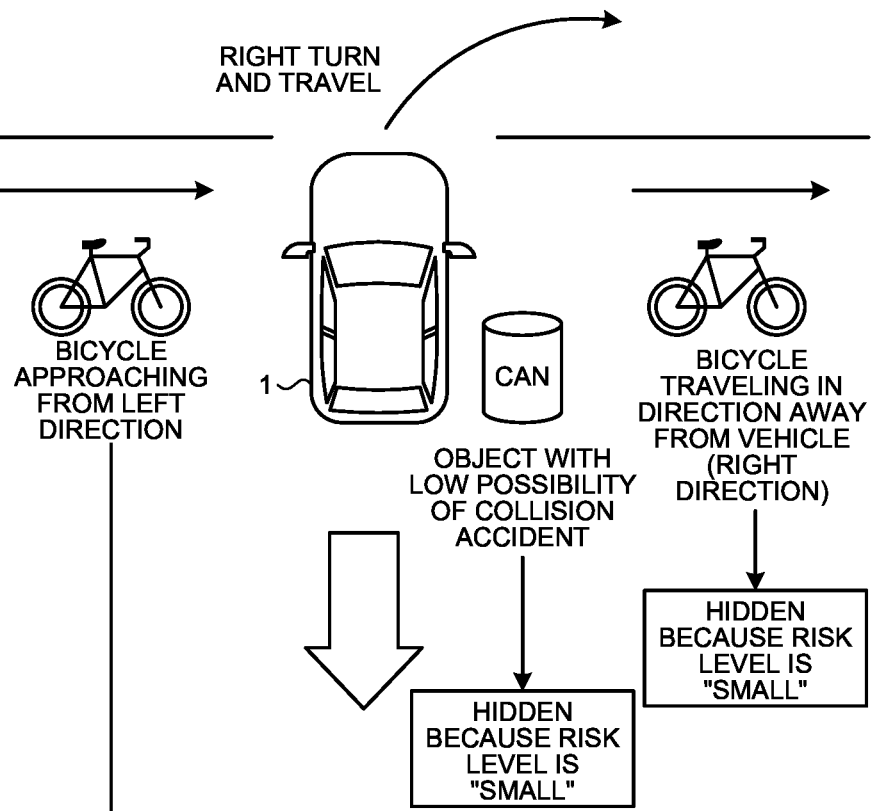
(b)
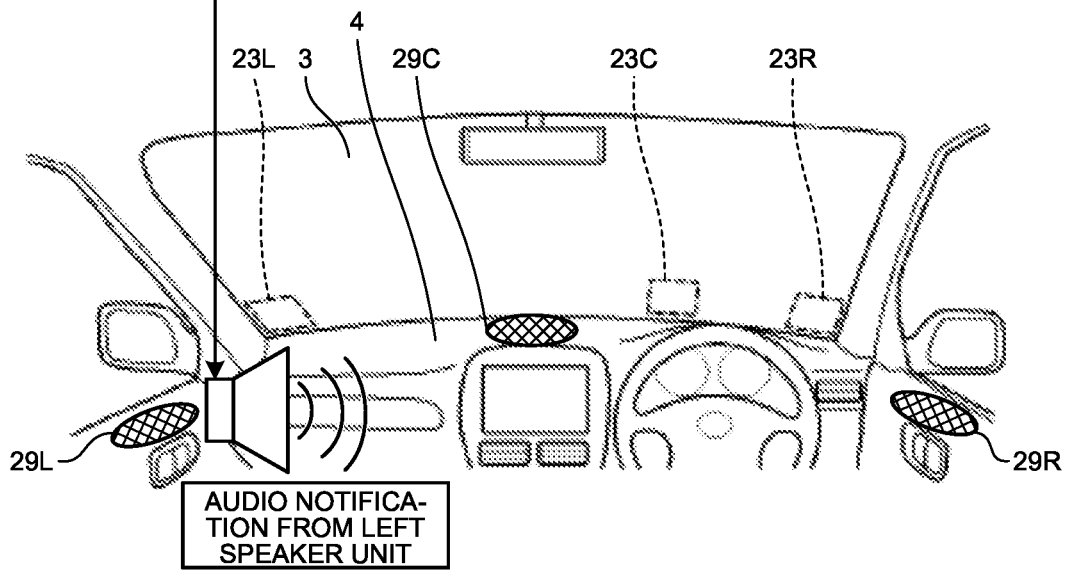

SAFETY CONFIRMATION SUPPORT DEVICE, SAFETY CONFIRMATION SUPPORT METHOD, AND SAFETY CONFIRMATION SUPPORT PROGRAM

CROSS-REFERENCE TO RELATED APPLICATIONS

This application is based upon and claims the benefit of priority from Japanese Patent Application No. 2021-042856, filed on Mar. 16, 2021, the entire contents of which are incorporated herein by reference.

FIELD

The present disclosure relates to a safety confirmation support device, a safety confirmation support method, and a recording medium.

BACKGROUND

Conventionally, a safe driving support system has been known and is disclosed in, for example, Japanese Patent Application Laid-open No. 2015-232859. Such a safe driving support system detects a moving object approaching a vehicle in each of multiple detection areas set around the vehicle. Then, from among display units arranged at different positions viewed from the driver, a display unit, which is associated with the detection area where the moving object has been detected, displays information about the moving object. As a result, the information about the moving object moving in the detection area, which is the driver's blind spot, can be displayed on the display unit located within the driver's current field of view, calling the driver's attention and supporting safety confirmation.

Prior embodiment. Japanese Patent Application Laid-open No. 2015-232859.

Abstract of Invention

The Problem for which the Invention can Solve

However, in the above-described safe driving support device, the amount of information about the moving object displayed on the display unit increases to be too complicated in places such as with large vehicles traffic and/or many pedestrians, rather causing confusion for the driver to discover which kind of possible conflict risk is most dangerous in driving.

According to the safety confirmation support device of this disclosure, it is possible to quantify and notify the appropriate information of object detection such as risk level and provide safety confirmation support device, safety confirmation support method, and safety confirmation support program in order to support safety confirmation.

SUMMARY

Method in Order to Solve the Problem

A safety confirmation support device (equipment system) according to the present disclosure contains hardware of storage unit and CPU processor and several sensing & display devices, and corresponding software including moving object detection unit, risk level detection unit, and output display control unit etc.

The moving object detection unit is used to detect an object in a detection area around a vehicle. The risk level detection unit is used to determine, for each detected object, a risk level indicating a level of risk affecting the vehicle. The output display control unit is used to control display information about the object via the one or more output devices when the risk level of the object is equal to or higher than a predetermined threshold value, and not to display the information about the object when the risk level is below the threshold value.

Effect of Invention

According to the safety confirmation support device of this disclosure, it is possible to quantify the appropriate information of object detection such as risk level and output the information in display, accordingly it is possible to support driver to drive vehicle safely.

BRIEF DESCRIPTION OF THE DRAWINGS

FIG. 19 is a diagram illustrating an example of a display form of information about a moving object for a display unit in the safety confirmation support system according to the fifth modification;

FIG. 22 is a diagram illustrating an example of an audio output form of the information about the moving object in the safety confirmation support system according to the fifth modification.

DETAILED DESCRIPTION

Hereinafter, the safety confirmation support system of an embodiment as an example of the present disclosure will be described.

System Configuration

Figure 1:
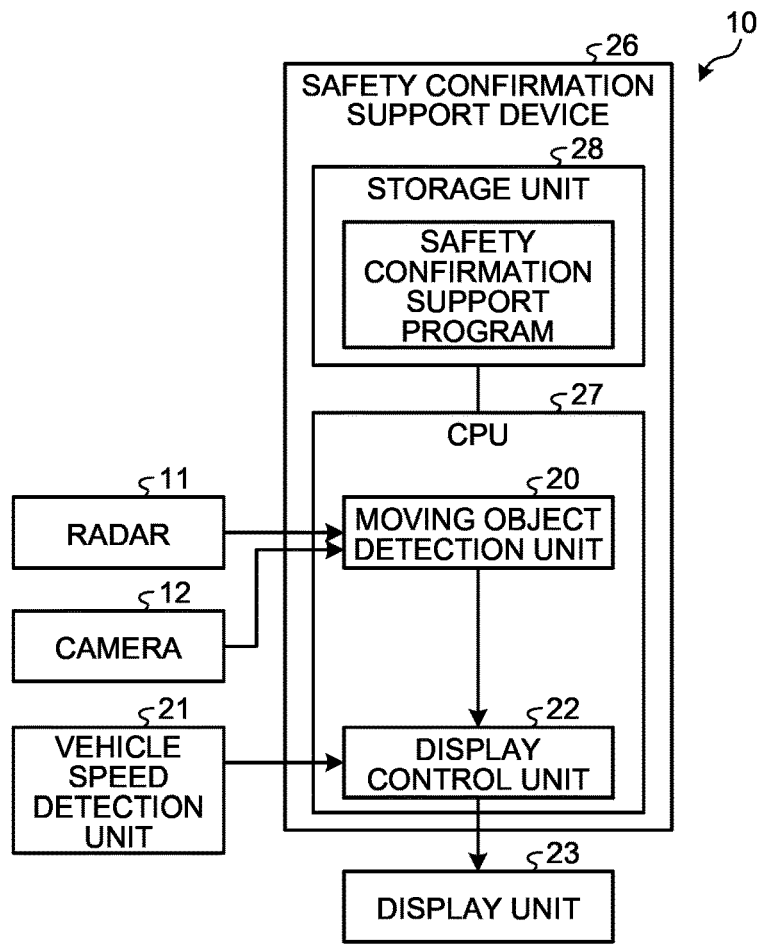
FIG. 1 is a diagram illustrating a system configuration of a safety confirmation support system of an embodiment.

FIG. 1 is a diagram illustrating a system configuration of a safety confirmation support system 10 of an embodiment. As an example, the safety confirmation support system 10 of the embodiment is provided in a vehicle such as an ordinary vehicle or a freight vehicle. As illustrated in FIG. 1, the safety confirmation support system 10 of the embodiment includes a radar 11, a camera 12, a vehicle speed detection unit 21, a display unit 23, and a safety confirmation support device 26.

The safety confirmation support device 26 includes a CPU 27 (an example of the hardware processor) and a storage unit 28. The storage unit 28 stores a safety confirmation support program for supporting safety confirmation when a vehicle 1 (an example of a main moving object) provided with the safety confirmation support device 26 is driven. By executing this safety confirmation support program, the CPU 27 functions as a moving object detection unit 20 and a display control unit 22.

In this embodiment, the moving object detection unit 20 and the display control unit 22 are implemented by software by executing the safety confirmation support program. Alternatively, all or part of the units may be implemented by hardware such as an integrated circuit (IC).

In addition, the safety confirmation support program may be provided by being recorded as the file information in an installable format or an executable format on a recording medium readable by a computer device such as a CD-ROM or a flexible disk (FD). In addition, the safety confirmation support program may be provided by recording the program on a non-transitory recording medium such as a CD-R, a digital versatile disk (DVD), a Blu-ray (registered trademark) disc, or a semiconductor memory, each being readable by a computer device. In addition, the safety confirmation support program may be provided in the form of being installed over a network such as the Internet. In addition, the safety confirmation support program may be provided by being programmed on a ROM or the like of the device in advance.

The radar 11 emits a radio wave toward a predetermined detection area to be described later, which is set around the vehicle. The radar 11 then acquires target information by receiving a reflected wave. The camera 12 captures an image of the detection area. The moving object detection unit 20 acquires target information from the radar 11 and the image of the detection area from the camera 12. The moving object detection unit 20 detects a moving object approaching the vehicle in the detection area on the basis of the target information acquired from the radar 11 and the image of the detection area captured by the camera 12. Then, the moving object detection unit 20 notifies the display control unit 22 of the moving object. The vehicle speed detection unit 21 detects the traveling speed (vehicle speed) of the vehicle and notifies the display control unit 22 of the traveling speed.

When the vehicle speed detected by the vehicle speed detection unit 21 is equal to or lower than the predetermined speed, the display control unit 22 performs display control of the information about the moving object detected by the moving object detection unit 20 on the display unit 23.

Figure 2:
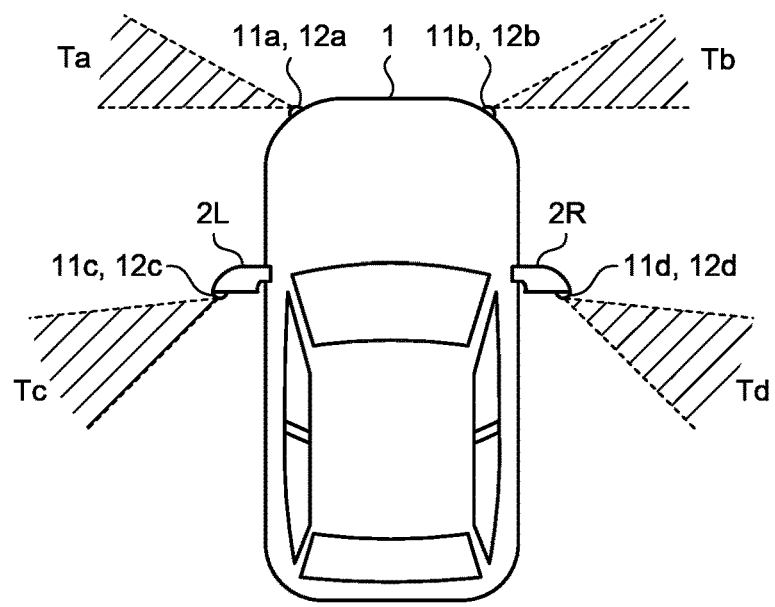
FIG. 2 is a diagram illustrating a detection area around a vehicle.

FIG. 2 is a diagram illustrating a detection area around the vehicle 1. As illustrated in FIG. 2, for the vehicle 1 provided with the safety confirmation support system 10 of the present embodiment, a first detection area Ta is set in front of the left side, and a second detection area Tb is set in front of the right side. In addition, for the vehicle 1, a third detection area Tc is set on the left side, and a fourth detection area Td is set on the right side.

For the settings above, a first radar 11a and a first camera 12a are provided on the left side of the front portion of the vehicle 1 to face the first detection area Ta. A second radar 11b and a second camera 12b are provided on the right side of the front portion of the vehicle 1 to face the second detection area Tb. A left side mirror 2L of the vehicle 1 is provided with a third radar 11c and a third camera 12c to face the third detection area Tc. The right side mirror 2R is provided with a fourth radar 11d and a fourth camera 12d to face the fourth detection area Td.

Figure 3:
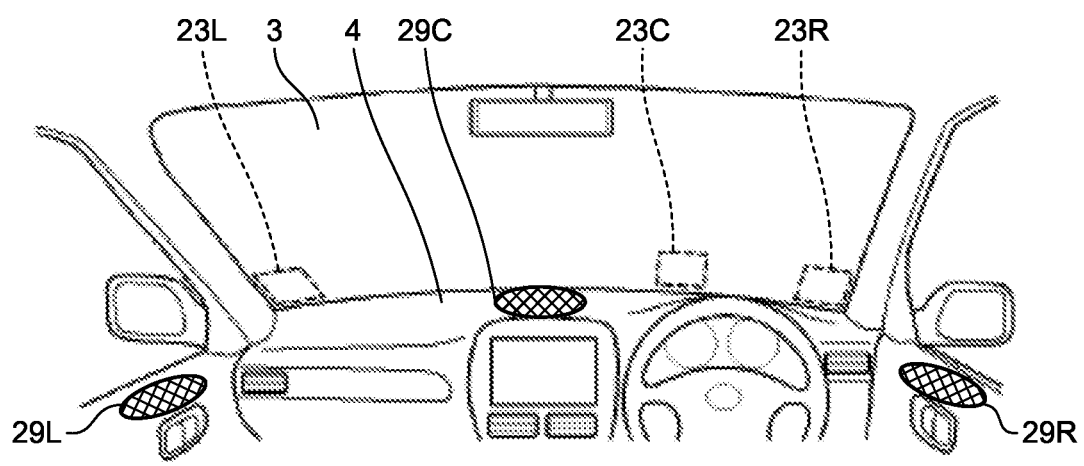
FIG. 3 is a diagram illustrating positions of a display unit and a speaker unit provided on the vehicle.

FIG. 3 is a diagram illustrating positions of the display unit 23 and a speaker unit 29 (an example of the one or more output devices) provided on the vehicle 1. The display unit 23 includes, for example, a head-up display device that displays a virtual image on a windshield 3 from the device main body provided in a dashboard 4. The display unit 23 includes a left display unit 23L provided to display an image in the vicinity of the lower left of the windshield 3, and a right display unit 23R provided to display an image in the vicinity of the lower right of the windshield 3. In addition, the display unit 23 includes a front display unit 23C provided to display an image in the vicinity of the center of the lower side portion of the windshield 3. The display unit 23 may also be provided on the back door glass of the vehicle 1.

Safety Confirmation Support Processing

Figure 4:
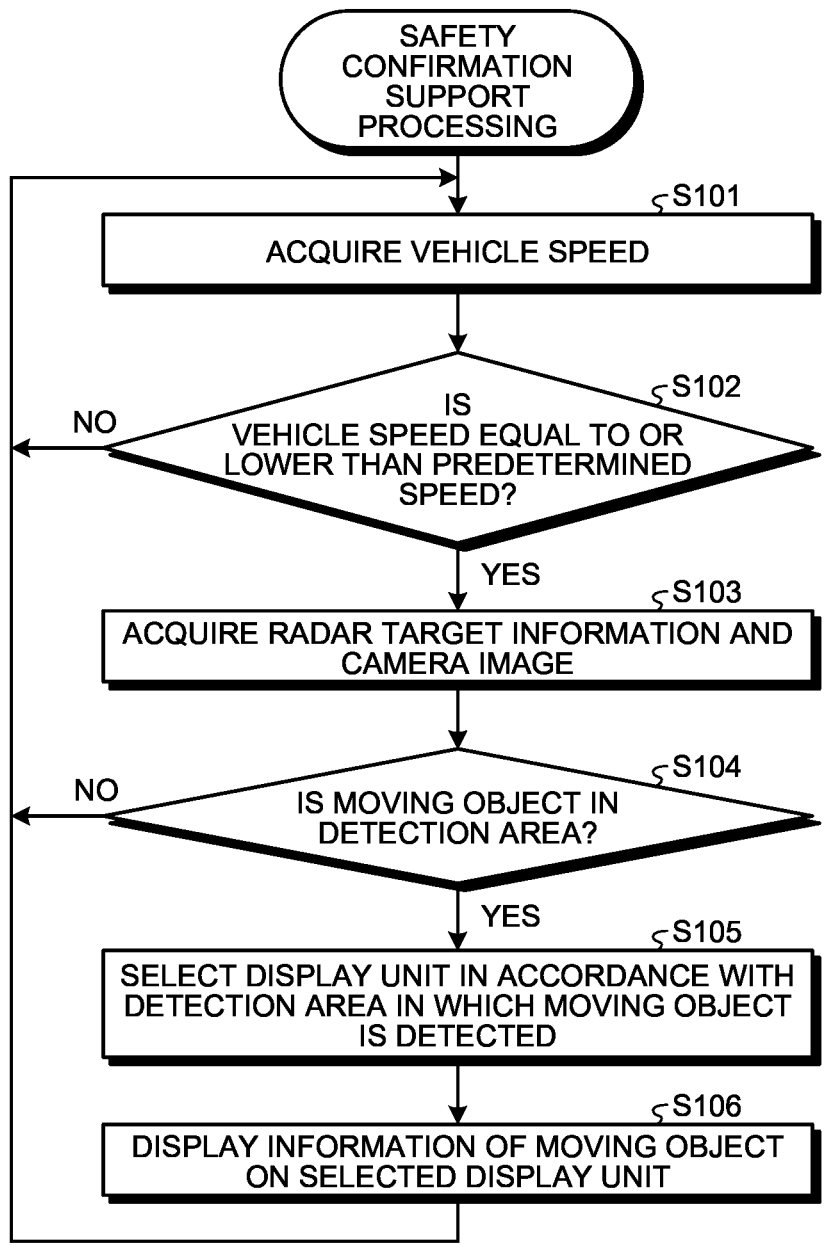
FIG. 4 is a flowchart of safety confirmation support processing executed by the safety confirmation support system of the embodiment.

FIG. 4 is a flowchart of safety confirmation support processing executed by the safety confirmation support system 10 of the embodiment. In the flowchart of FIG. 4, when the safety confirmation support processing is started, the display control unit 22 first acquires the traveling speed (vehicle speed) of the vehicle 1 detected by the vehicle speed detection unit 21 (step S101). The display control unit 22 determines, on the basis of the acquired traveling speed, whether or not the vehicle speed is currently equal to or lower than the predetermined speed (for example, 5 km/h) (step S102).

In the safety confirmation support system 10 of the embodiment, the safety confirmation of the driver is mainly supported in a scene where the vehicle 1 is temporarily stopped or running at a low speed, for example. Therefore, when the vehicle speed exceeds the predetermined speed (step S102: No), the safe driving support processing returns to step S101, and the safety confirmation support processing is in the standby state until the vehicle speed becomes equal to or lower than the predetermined speed.

In addition to the vehicle speed, the display control unit 22 may determine whether or not the vehicle 1 is in the situation or the place (for example, an intersection) necessary to support safety confirmation on the basis of, for example, the position information, the map information, or the like of the vehicle 1 acquired from the car navigation system.

On the other hand, when the vehicle speed is equal to or lower than the predetermined speed (step S102: Yes), the moving object detection unit 20 acquires the target information detected by the radar 11 and the captured image of the camera 12 (step S103). The moving object detection unit 20 determines whether or not a moving object approaching the vehicle 1 is present in the detection area on the basis of the acquired target information and the captured image (step S104).

As described above, the four detection areas Ta to Td are set around the vehicle 1. The moving object detection unit 20 determines the presence or absence of a moving object in each of those detection areas by analyzing the target information detected by the radars 11a to 11d for each detection area. In addition, the moving object detection unit 20 analyzes the captured images of the cameras 12a to 12d for each detection area, and determines the type of the moving object such as a pedestrian or a bicycle. The moving object detection unit 20 determines the type of such a moving object by using multiple templates of a pedestrian, a bicycle, and the like prepared in advance. The moving object detection unit 20 determines the type of the moving object on the basis of the template that matches the moving object in the captured image.

In the embodiment, the radar 11 is used for detecting a moving object, but the present invention is not limited to the radar. For example, a moving object may be detected by using sonar that acquires target information by emitting a sound wave toward the detection area and receiving the reflection. In addition, by storing the captured image of the camera 12 and comparing it with the previous captured image, an object approaching the vehicle 1 may be detected as a moving object.

In response to determining that no moving object is present in the detection area (step S104: No), the processing returns to step S101, and the safety confirmation support processing is in the standby state until the vehicle speed becomes equal to or lower than the predetermined speed.

On the other hand, in response to determining that a moving object is present in the detection area (step S104: Yes), the display control unit 22 selects the display unit 23 out of the display units 23L, 23C, and 23R, which corresponds to one of the detection areas (Ta to Td) in which the moving object is detected (step S105). Then, the display control unit 22 controls the selected display unit 23 to display information about the moving object (an image obtained by capturing the moving object) (step S106). After that, the safety confirmation support processing returns to step S101, and the above-described series of processing is repeatedly executed.

First Situation

Figure 5:
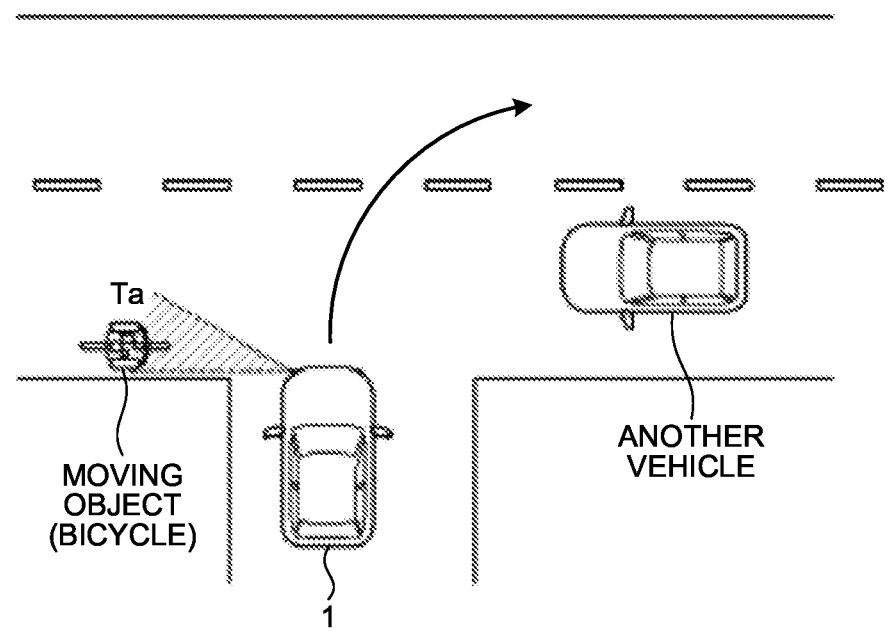
FIG. 5 is a diagram illustrating a first situation that is an example of detecting a moving object around a vehicle.

FIG. 5 is a diagram illustrating a first situation that is an example of detecting a moving object around the vehicle 1. The first situation is an example that the vehicle 1 as is a present vehicle is temporarily stopped in order to make a right turn approach from a narrow T-junction road (a non-priority road) toward a wide road (a priority road). In this first situation, another vehicle approaching from the right side of the vehicle 1 and a bicycle approaching from the left side of the vehicle 1 are both present on the priority road.

In such a first situation, while the first radar 11a detects the target information of the first detection area Ta on the left front side of the vehicle 1, the first camera 12a captures an image of the first detection area Ta. The moving object detection unit 20 detects a bicycle that is moving in the first detection area Ta as a moving object, on the basis of the target information from the first radar 11a and the captured image of the first detection area Ta from the first camera 12a.

Figure 6:
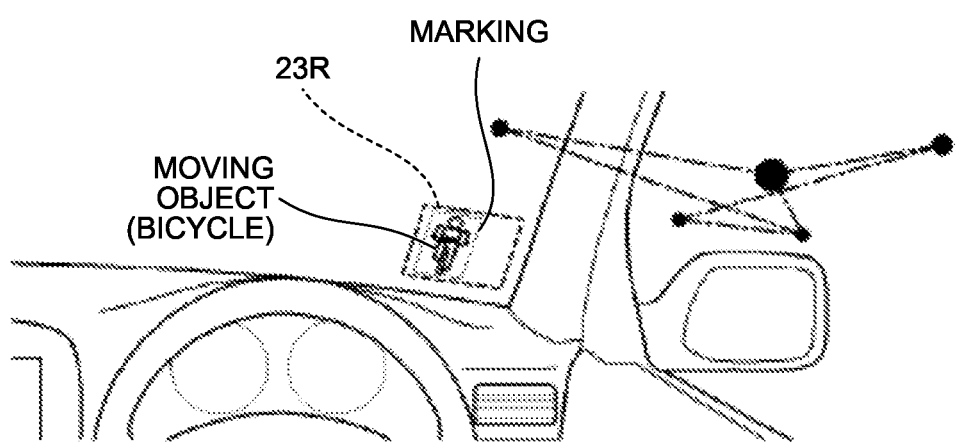
FIG. 6 is a diagram illustrating a display form of the moving object detected in the first situation.

FIG. 6 is a diagram illustrating a display form of the moving object detected in such a first situation. The alternate long and short dash line connecting the filled circles depicted in FIG. 6 exemplifies the trajectory of the driver's line of sight in the first situation. The size of the filled circle increases in proportion to the length of the retention time of the line of sight. The driver's line of sight is concentrated on the right side of the driver's seat in order to confirm the safety of another vehicle approaching from the right side. In this case, the safety confirmation for the moving object (bicycle) approaching from the left side may possibly be neglected.

The right display unit 23R is associated with the first detection area Ta. Therefore, the display control unit 22 controls the right display unit 23R to display the image of the moving object detected in the first detection area Ta (the image captured by the first camera 12a facing the first detection area Ta). As a result, the presence of the moving object detected in the first detection area Ta in the left direction opposite to the gaze direction can be cautioned via the right display unit 23R to the driver who is gazing in the right direction from the driver's seat. Therefore, it is possible to call safety confirmation for the moving object.

On the other hand, when the driver is gazing in the left direction from the driver's seat, there is a high possibility that the moving object detected in the first detection area Ta is present within the driver's field of vision. In this case, the display control unit 22 controls the left display unit 23L not to display the information of the moving object detected in the first detection area Ta. As a result, useless display can be reduced. Even when the driver is gazing in the direction of the moving object from the driver's seat, the information of the moving object may be displayed on the display unit 23 corresponding to the direction in which the driver is gazing.

Next, it is assumed, on the priority road illustrated in FIG. 5, that another vehicle is approaching from the left side of the vehicle 1 and a bicycle is approaching from the right side of the vehicle 1. In this case, in order to confirm the safety of another vehicle approaching from the left side, the driver's line of sight tends to concentrate in the left direction from the driver's seat, and the safety confirmation of the moving object (bicycle) approaching from the right side tends to be neglected.

The left display unit 23L is associated with the second detection area Tb (FIG. 2) on the right front side of the vehicle 1. When a moving object is detected in the second detection area Tb, the display control unit 22 controls the left display unit 23L to display an image of the moving object (an image captured by the second camera 12b facing the second detection area Tb). As a result, the presence of the moving object detected in the second detection area Tb in the right direction opposite to the gaze direction can be cautioned via the left display unit 23L to the driver who is gazing in the left direction from the driver's seat. Therefore, it is possible to call safety confirmation for the moving object.

Next, the vehicle 1 with a right-hand drive is provided with a driver's seat on the right side in the forward direction. Therefore, even when the driver's line of sight is facing the front, it tends to be difficult to notice the moving object approaching from the left side as compared with the moving object approaching from the right side.

The front display unit 23C illustrated in FIG. 3 is associated with the first detection area Ta. When a moving object is detected in the first detection area Ta, the display control unit 22 controls the front display unit 23C to display an image of the moving object. As a result, even when the driver is gazing at the front of the vehicle 1, the presence of a moving object approaching from the left side can be recognized via the front display unit 23C.

Such a display unit 23 is installed within a range (a guided field of view) of about 50 degrees to the left and right, about 35 degrees above, and about 50 degrees below with respect to the driver's line of sight. Therefore, it is possible to call safety confirmation for the moving object to the driver by displaying an image of the moving object on the display unit 23, which does not display anything until the moving object is detected, at the timing when the moving object is detected.

In addition, the display unit 23 displays, as information about the moving object, an image obtained by capturing the moving object, and thereby the range difficult for the driver to recognize is supplemented by the image displayed on the display unit 23. Therefore, the driver can confirm the moving object without facing the direction in which the moving object is detected.

In addition, the display control unit 22 controls the display unit 23 to display the moving object along with marking processing to emphasize the moving object, such as that the moving object to be displayed is surrounded by a frame line. This makes it easier for the driver to notice the moving object.

In addition, the display control unit 22 enlarges the moving object to be displayed in the image of the detection area captured by the camera 12. As a result, the accuracy of the information of the moving object can be improved, and the driver can easily grasp the moving object.

Second Situation

Figure 7:
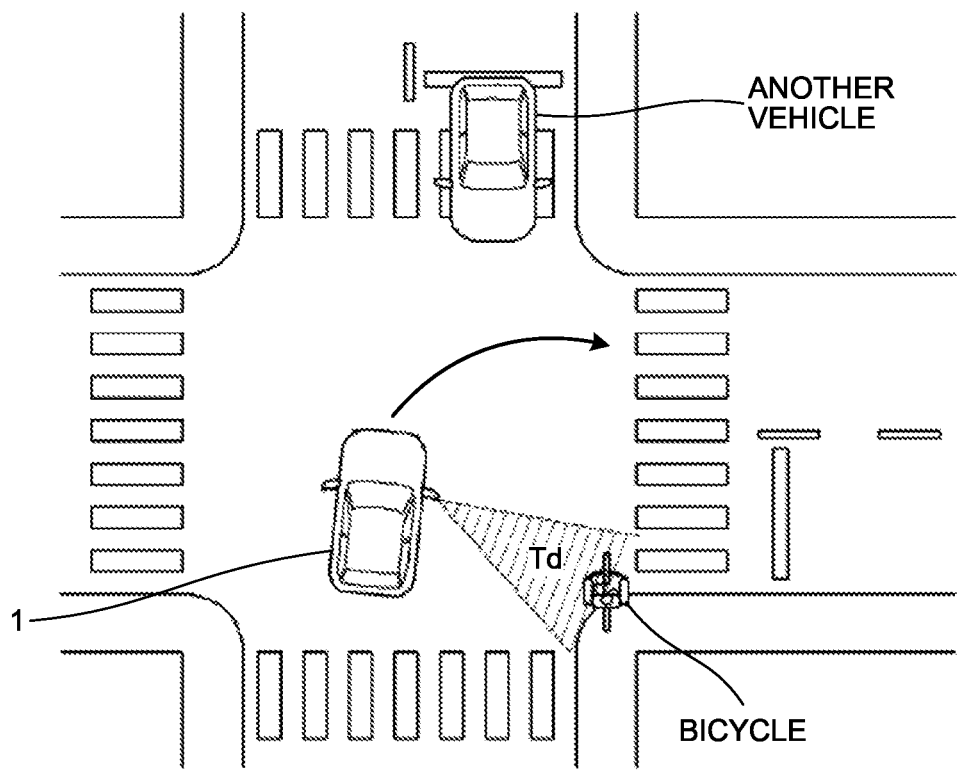
FIG. 7 is a diagram illustrating a second situation that is an example of detecting a moving object around a vehicle.

FIG. 7 is a diagram illustrating a second situation that is an example of detecting a moving object around the vehicle 1. As illustrated in FIG. 7, the second situation is a situation in which the vehicle 1 as the present vehicle is temporarily stopped at the intersection and waiting for a right turn because there is another vehicle traveling straight through the intersection in the oncoming lane. In addition, the second situation is a situation where the vehicle 1 is going to turn to the right where a pedestrian crossing is located while a bicycle is about to cross the pedestrian crossing from the right rear of the vehicle 1.

In such a second situation, the fourth radar 11*d* detects the target information of the fourth detection area Td on the right side of the vehicle 1, and the fourth camera 12*d* captures an image of the fourth detection area Td. The moving object detection unit 20 detects a bicycle that moves in the fourth detection area Td as a moving object, on the basis of the target information from the fourth radar 11*d* and the captured image of the fourth detection area Td from the fourth camera 12*d*. The fourth detection area Td is an area that is not reflected on the right side mirror 2R and is an area that can be visually recognized by the driver facing the right side.

Figure 8:
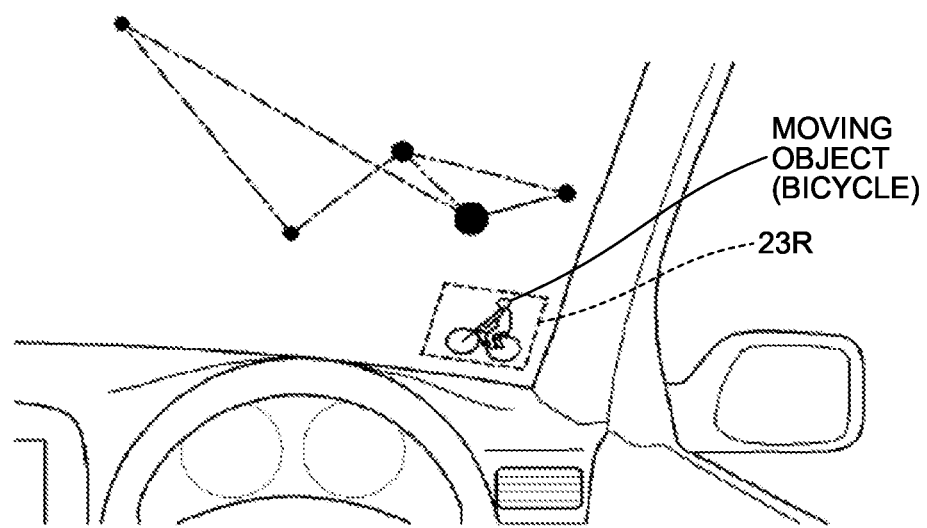
FIG. 8 is a diagram illustrating a display form of the moving object detected in the second situation.

FIG. 8 is a diagram illustrating a display form of the moving object detected in such a second situation. The alternate long and short dash line connecting the filled circles depicted in FIG. 8 exemplifies the trajectory of the driver's line of sight in the second situation. The size of the filled circle increases in proportion to the length of the retention time of the line of sight. The driver's line of sight is mainly concentrated on the right side in front of the driver's seat in order to confirm the safety for other vehicles traveling straight in the oncoming lane while recognizing changes in traffic lights. In this case, the safety confirmation for the moving object (bicycle), which is about to cross the pedestrian crossing located at the right-turn side of the vehicle 1, may possibly be neglected.

The fourth detection area Td is associated with the right display unit 23R. When a moving object is detected in the fourth detection area Td, the display control unit 22 controls the right display unit 23R to display an image of the moving object (an image captured by the fourth camera 12*d* facing the fourth detection area Td). As a result, the presence of the moving object detected in the fourth detection area Td in the direction orthogonal to the gaze direction can be cautioned via the right display unit 23R to the driver who is gazing at the right side in front of the driver's seat. Therefore, it is possible to call safety confirmation for the moving object.

The safety confirmation support system 10 of such an embodiment associates any of the detection areas Ta to Td set around the vehicle 1 with the display units 23L, 23C, and 23R provided in different directions in a view from the driver's seat. Then, information about the moving object (an image obtained by capturing the moving object) is displayed on the display unit associated with the detection area where the moving object has been detected. As a result, the driver, who is gazing in the direction in which any of the display units 23 enters the field of vision of the driver, is not required to change the gaze direction. The presence of the moving object detected in the detection area in a direction different from the gaze direction can be cautioned to the driver. Therefore, it is possible to urge the driver to confirm the safety of the moving object, and for example, the occurrence of a contact accident with the moving object can be prevented.

In addition, the direction in which the driver gazes changes depending on the situation. Therefore, if all the information of the moving object detected in the detection areas Ta to Td set around the vehicle 1 is displayed on the common display unit (for example, the display of the car navigation system), the driver may overlook it. On the other hand, out of the display units 23L, 23C, and 23R associated with any of the detection areas Ta to Td, it is possible to urge safety confirmation for the moving object by displaying the information of the moving object on any of the display unit 23 that is in the driver's field of vision and making it easier for the driver to notice the presence of the moving object.

Moreover, the display units 23L, 23C, and 23R are associated with a different one of the detection areas Ta to Td. Thus, when a moving object is detected from the detection area in the direction in which the driver is gazing, the information about the moving object is not displayed on the display unit 23 that is located in the direction in which the driver is gazing. Accordingly, by not displaying the information of the moving object that the driver has already recognized, it is possible to prevent the inconvenience that annoys the driver.

First Modification (Variation Example)

In the above example, as the information about the moving object detected in the detection areas Ta to Td, the image of the moving object captured by the camera 12 facing the detection area is displayed on the display unit 23. The information of the moving object displayed on the display unit 23 may be any information other than the captured image of the moving object as long as it directs the driver's attention to the moving object.

Figure 9:
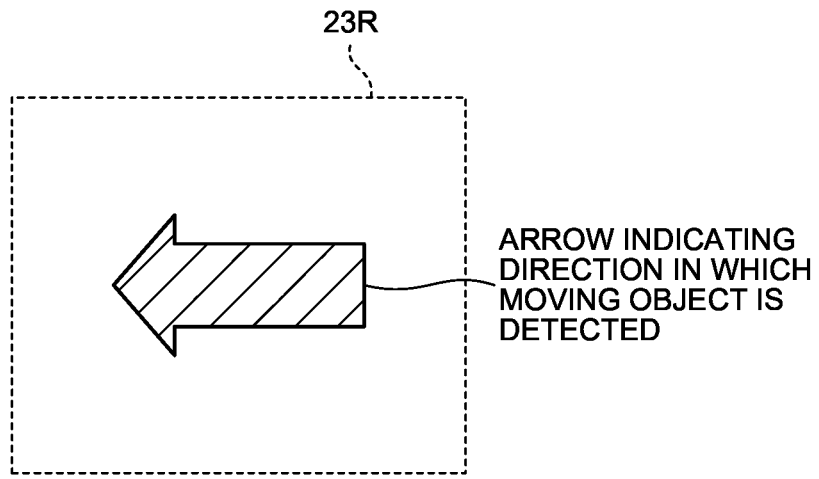
FIG. 9 is a diagram illustrating a display form according to a first modification.

FIG. 9 illustrates an example of displaying an arrow indicating the direction in which the moving object is detected as information about the moving object. Even in this way, the presence and detection direction of the moving object can be cautioned to the driver, and the driver's attention can be directed to the moving object. Therefore, it is possible to urge safety confirmation for the moving object. In addition, in this case, the camera 12 that captures an image of the moving object can be eliminated, and the system configuration of the safety confirmation support system 10 of the embodiment can be simplified.

Second Modification (Variation Example)

Figure 10:
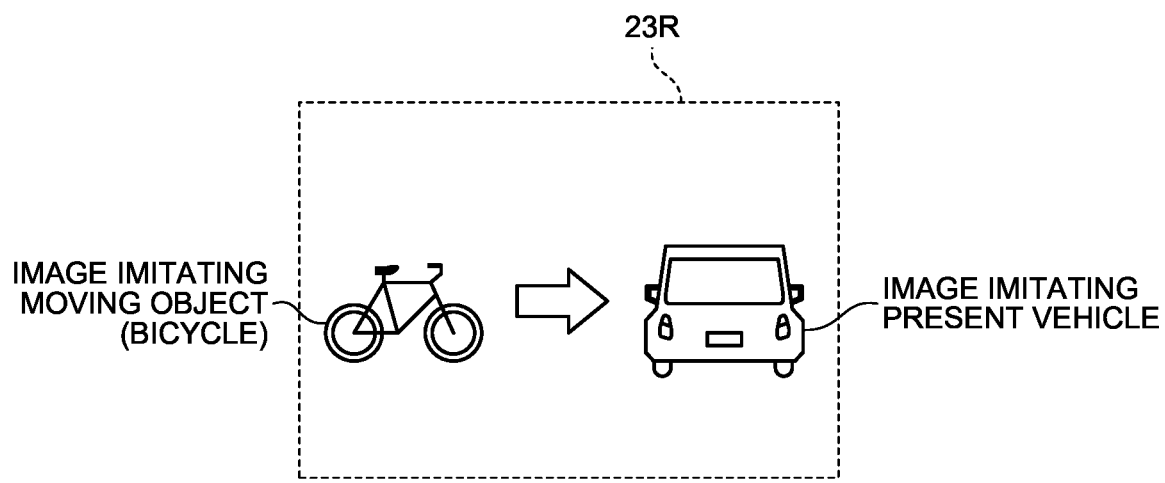
FIG. 10 is a diagram illustrating a display form according to a second modification.

Moreover, as illustrated in FIG. 10, an image imitating the vehicle 1 and an image imitating a moving object (for example, a bicycle) may be displayed on the display unit 23, and an arrow indicating the direction in which the moving object approaches the vehicle 1 may be displayed on the display unit 23.

As a result, it is possible to caution the driver to know what kind of moving object is approaching the vehicle 1 from which direction, and it is possible to direct the driver's attention to the moving object. Therefore, it is possible to urge safety confirmation for the moving object to the driver.

Third Modification (Variation Example)

Figure 11:
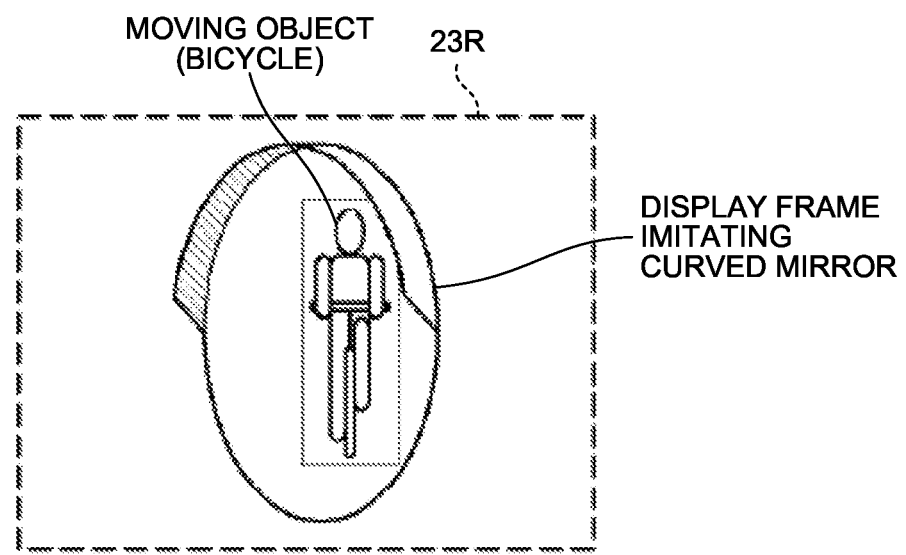
FIG. 11 is a diagram illustrating a display form according to a third modification.

As illustrated in FIG. 11, a display frame imitating a curved mirror and an image obtained by capturing a moving object (for example, a bicycle) in a detection area inside the display frame may be displayed on the display unit 23. In this case, the display control unit 22 performs control of displaying the display frame of the curved mirror in a manner that the moving object faces the detected direction. In this case, the display control unit 22 performs the display control such that a mirror image is displayed, in which the left and right sides are inverted as a captured image of the moving object. As a result, the driver can grasp the direction of the moving object from the direction of the curved mirror that is the display frame, and can confirm the moving object with the mirror image reflected (displayed) inside the display frame. The curved mirror is used for safety confirmation at a corner of a road or the like, and by displaying the information of the moving object in a display form imitating this, the driver can easily recognize the moving object.

Fourth Modification (Variation Example)

The above-described embodiment has been explained as an example of displaying the information of the moving object on the display units 23L, 23C, and 23R associated with the detection areas Ta to Td in which the moving object is detected, regardless of the direction (line of sight) that the driver is looking at. However, as described below, information of the moving object may be displayed on the display unit 23 corresponding to the driver's line of sight.

Figure 12:
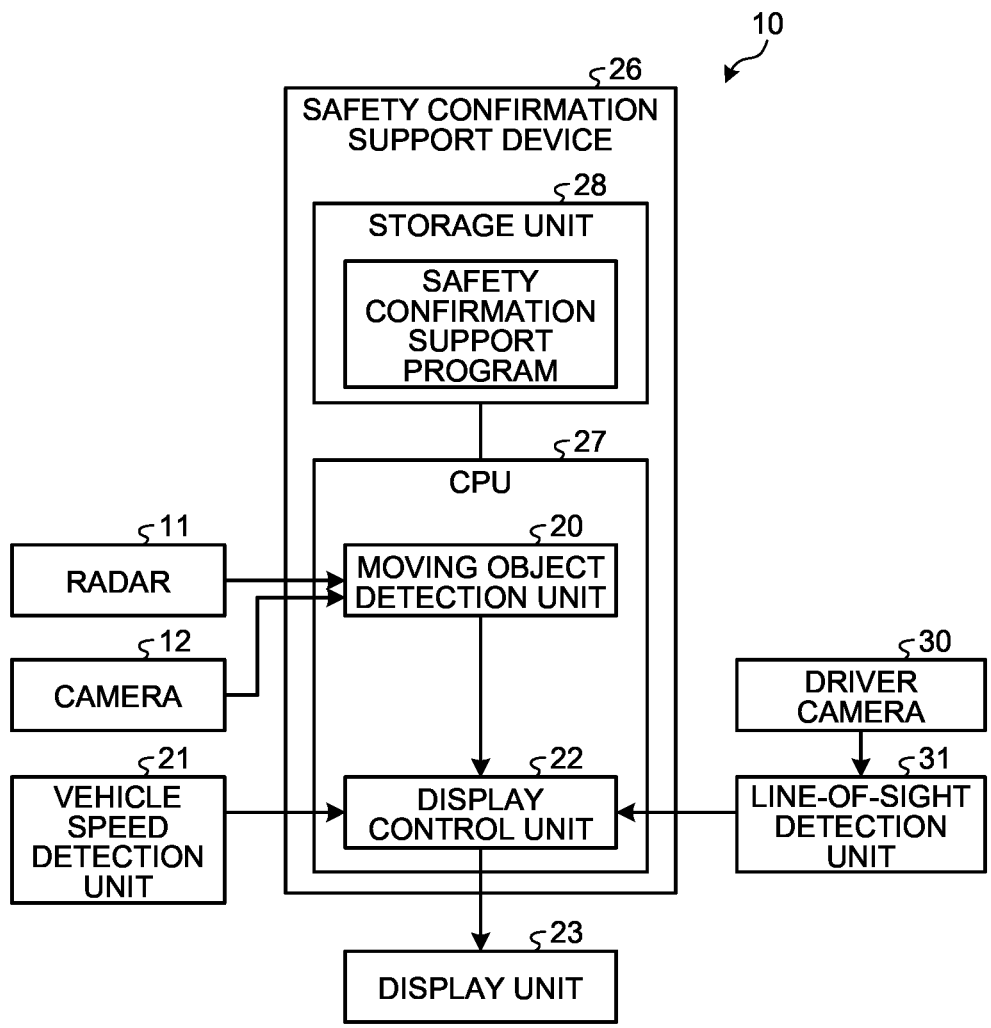
FIG. 12 is a diagram illustrating a system configuration of a safety confirmation support system according to a fourth modification.

FIG. 12 is a diagram illustrating a system configuration of a safety confirmation support system 10 according to a fourth modification. As illustrated in FIG. 12, the safety confirmation support system 10 of the fourth modification includes a driver camera 30 and a line-of-sight detection unit 31 (an example of a line-of-sight detection device) in addition to the system configuration of the above-described embodiment.

The driver camera 30 is provided inside the vehicle and captures an image of the driver's face. The line-of-sight detection unit 31 analyzes the driver's face image captured by the driver camera 30 and detects the driver's line of sight. The display control unit 22 controls the display unit 23 on the basis of the driver's line of sight detected by the line-of-sight detection unit 31.

Figure 13:
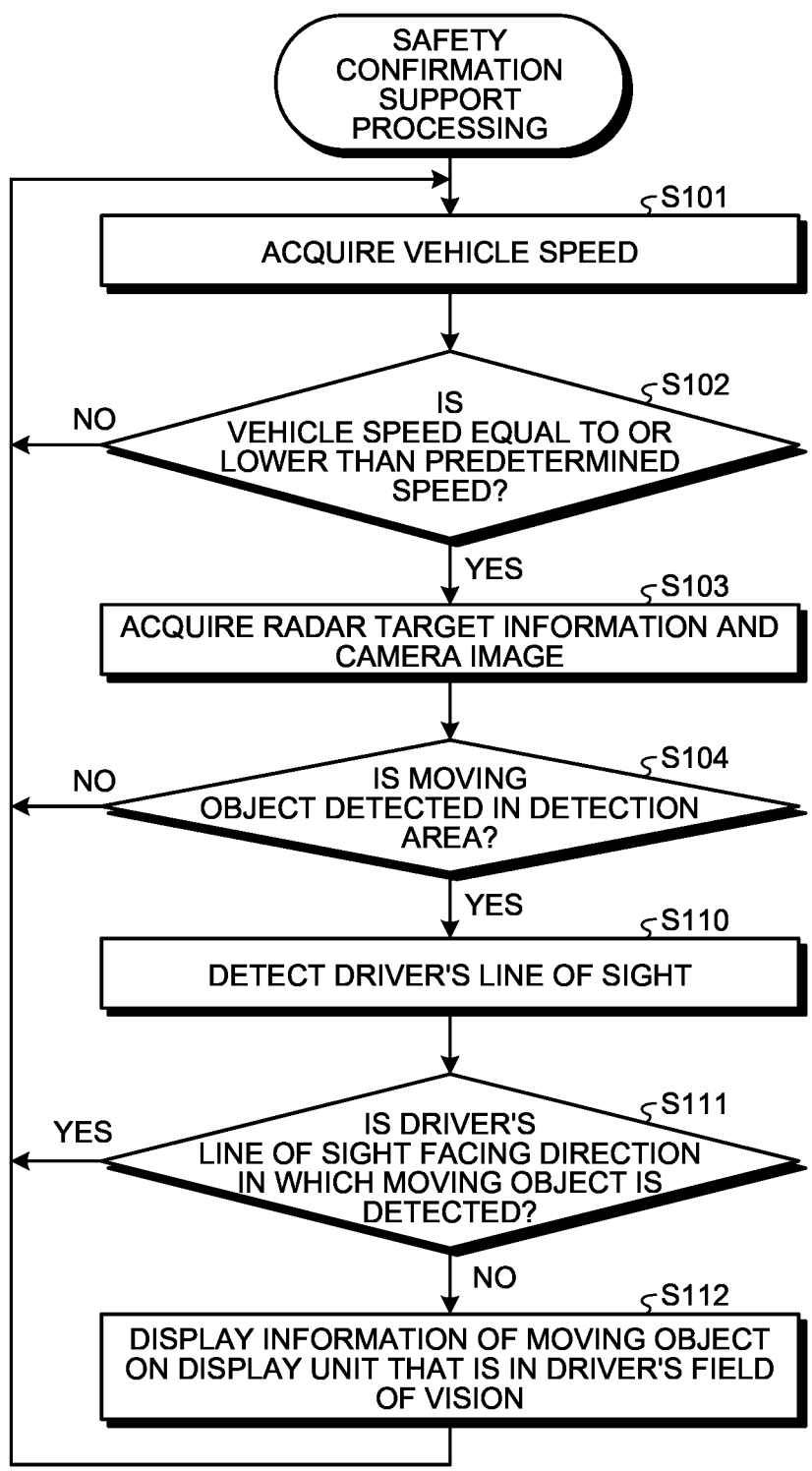
FIG. 13 is a flowchart of safety confirmation support processing executed by the safety confirmation support system according to the fourth modification.

FIG. 13 is a flowchart of safety confirmation support processing executed by the safety confirmation support system 10 according to the fourth modification. In the flowchart of FIG. 13, when the safety confirmation support processing is started, the display control unit 22 acquires the vehicle speed of the vehicle 1 detected by the vehicle speed detection unit 21 (step S101). The display control unit 22 determines whether or not the current vehicle speed is equal to or lower than the predetermined speed (for example, 5 km/h) (step S102). When the display control unit 22 determines that the current vehicle speed is not equal to or lower than the predetermined speed (step S102: No), the processing returns to step S101, and the vehicle speed confirmation processing is repeatedly executed.

On the other hand, when the display control unit 22 determines that the current vehicle speed is equal to or lower than the predetermined speed (step S102: Yes), the moving object detection unit 20 acquires the target information captured by the radar 11 and the captured image from the camera 12 (step S103). The moving object detection unit 20 determines whether or not a moving object approaching the vehicle 1 is present in the detection area, on the basis of the target information and the captured image (step S104). If no moving object is present in the detection area (step S104: No), the processing returns to step S101, and the vehicle speed confirmation processing is repeatedly executed.

On the other hand, when the moving object is present in the detection area (step S104: Yes), the display control unit 22 acquires the line-of-sight information indicating the driver's line of sight detected by the line-of-sight detection unit 31 (step S110). As an example, the driver's line of sight can be detected on the basis of the position of the iris (or pupil) portion of the eyeball identified from the driver's face image captured by the driver camera 30.

Next, the display control unit 22 determines, on the basis of the acquired line-of-sight information of the driver, whether or not the driver is facing the directions of the detection areas Ta to Td in which the moving object is detected (step S111). For example, in the first situation described above with reference to FIG. 5, it is assumed that the driver's line of sight is facing the direction of the first detection area Ta (left front of the vehicle 1) in which the moving object is detected (step S111: Yes). In this case, there is a high possibility that the driver has already recognized the moving object detected by the moving object detection unit 20. Therefore, the display control unit 22 controls the display unit 23 not to display the information of the moving object. Then, the processing returns to step S101.

On the other hand, when the driver's line of sight is not directed toward the detection area where the moving object has been detected (step S111: No), there is a high possibility that the driver is not aware of the moving object. In this case, the display control unit 22 performs display control such that the information of the moving object is displayed on the display unit 23 that is within the driver's field of vision (step S112). For example, in the first situation described with reference to FIG. 5, a moving object is detected in the first detection area Ta, but the driver's line of sight is directed toward another vehicle approaching from the right side. In this case, the display control unit 22 controls the right display unit 23R to display the information of the moving object.

As a result, information of the moving object detected in the detection area, which is not visible to the driver, can be displayed on the display unit 23 located within the driver's field of vision. Therefore, it is possible to make it easier for the driver to recognize the presence of a moving object that is difficult for the driver to notice.

The information of the moving object is not displayed on the display unit 23 that is out of the driver's field of vision. Therefore, the display unit 23 outside the driver's field of vision is not driven, so that the inconvenience of wasting power can be prevented.

In addition, the information of the moving object detected from the detection area in the direction of the driver's line of sight is not displayed on the display unit 23 located within the driver's field of vision. As a result, it is possible to prevent the inconvenience of annoying the driver by displaying the information of the moving object recognized by the driver on the display unit 23 in an overlapping manner.

Fifth Modification (Variation Example)

In the above-described embodiment and each modification, if the information of the detected moving object is simply displayed on the display unit 23, the amount of information to be displayed increases in, for example, a place where the traffic volume of vehicles is large or a place where there are many pedestrians, rather causing confusion for the driver. On the other hand, if the approach of a moving object is notified by audio together with images to call attention about the moving object, the driver can recognize the presence of the moving object without moving his/her perspective to the display unit 23. For this reason, in the safety confirmation support system 10 according to the fifth modification, the information about the moving object with the appropriate amount is notified, and the notification is given through an audio output as well as the image display.

Figure 16:
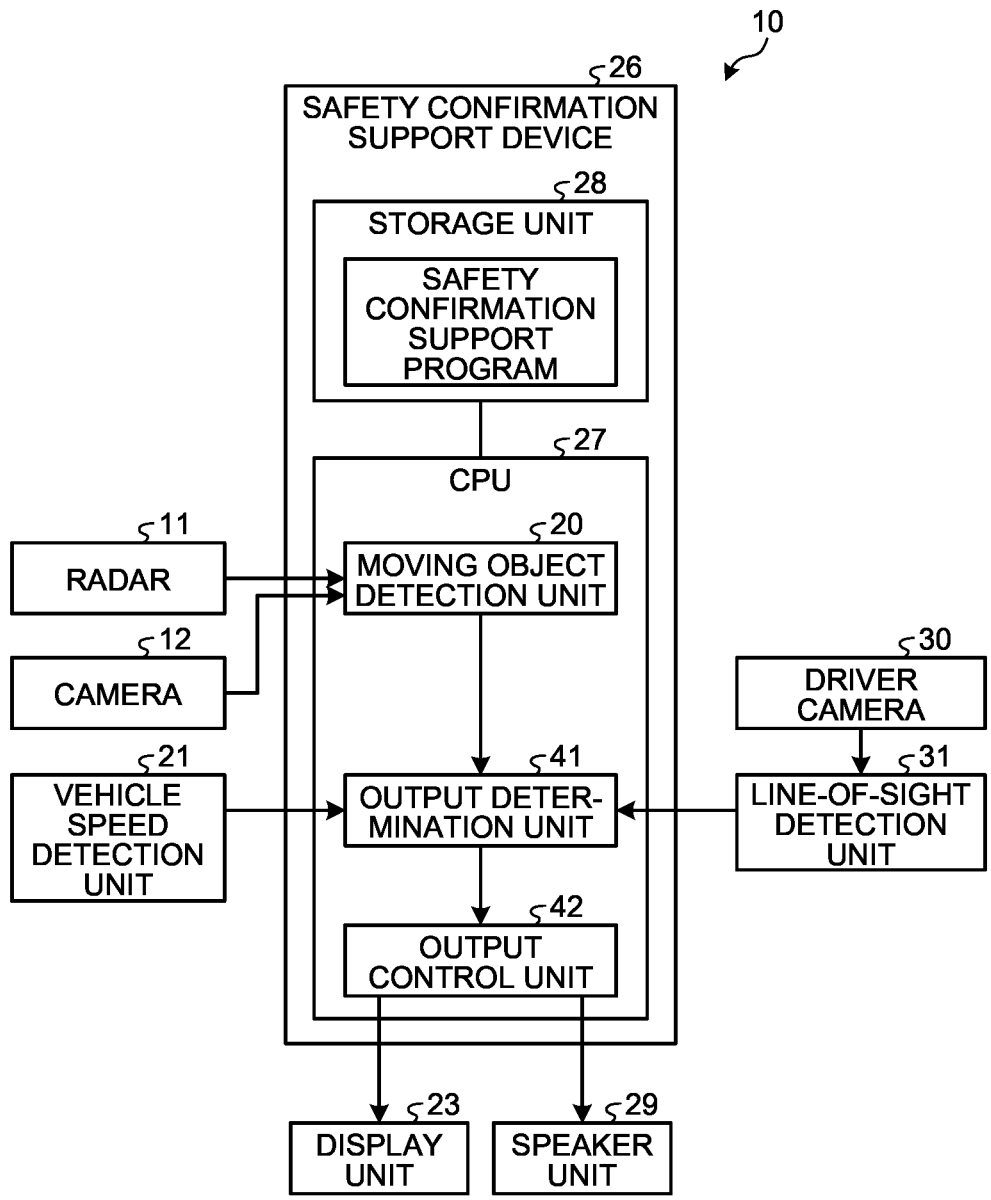
FIG. 16 is a diagram illustrating a system configuration of a safety confirmation support system according to a fifth modification.

FIG. 16 is a system configuration diagram of the safety confirmation support system 10 according to the fifth modification. As illustrated in FIG. 16, the safety confirmation support system 10 according to the fifth modification includes the driver camera 30 and the line-of-sight detection unit 31 that detect the driver's line of sight, the display unit 23, as well as the speaker unit 29 for obtaining the audio output of the information about the moving object. The display unit 23 and the speaker unit 29 are an example of the one or more output devices.

In addition, the CPU 27 implements each function of an output determination unit 41 and an output control unit 42 in addition to the moving object detection unit 20 by executing the safety confirmation support program stored in the storage unit 28. The moving object detection unit 20 detects moving objects such as bicycles and pedestrians, as well as stationary objects such as guardrails and utility poles. The output determination unit 41 is an example of a moving object detection unit and a risk level detection unit, and determines a moving object to be reported (to be displayed by images and output by audio) out of the moving objects detected by the moving object detection unit 20. The output control unit 42 performs display control of the information about the moving object determined to be reported on the display unit 23, and also performs the audio output control via the speaker unit 29.

In the same manner as described above, the moving object detection unit 20, the output determination unit 41, and the output control unit 42 are implemented by the CPU 27 executing the safety confirmation support program stored in the storage unit 28. However, at least one of the moving object detection unit 20, the output determination unit 41, and the output control unit 42 may be implemented by hardware.

As illustrated in FIG. 3, the speaker unit 29 includes a left speaker unit 29L provided on the left door, a right speaker unit 29R provided on the right door, and a front speaker unit 29C provided substantially in the center of the dashboard 4. The speaker unit 29 may also be provided on the rear seat side of the vehicle 1. As will be described later, output control of a warning sound or the like is performed by the speaker unit 29 that is selected on the basis of the moving direction of the moving object in order to call the driver's attention.

Safety Confirmation Support Processing

Figure 17:
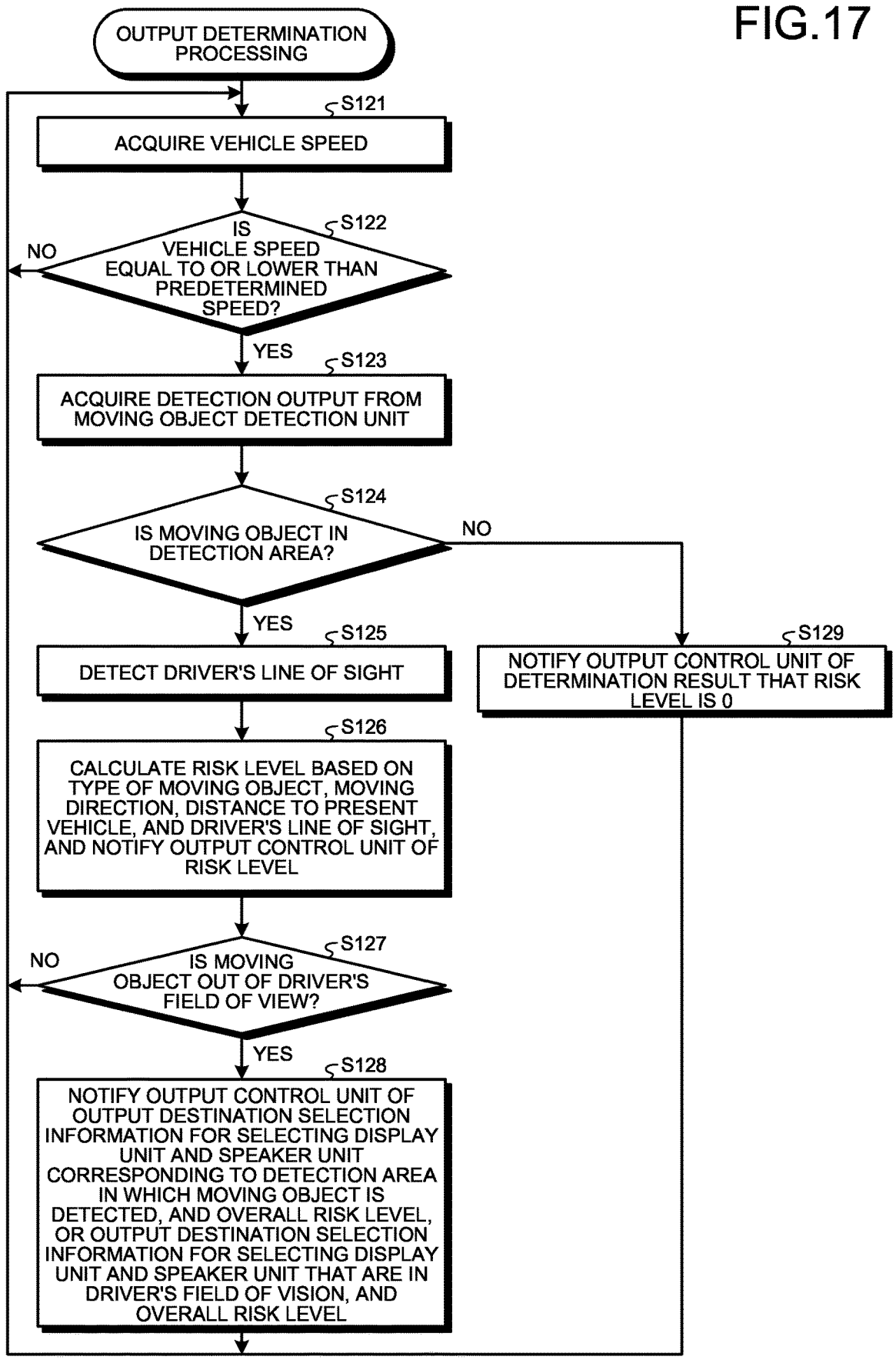
FIG. 17 is a flowchart illustrating a flow of output determination processing in safety confirmation support processing of the safety confirmation support system according to the fifth modification.
Figure 18:
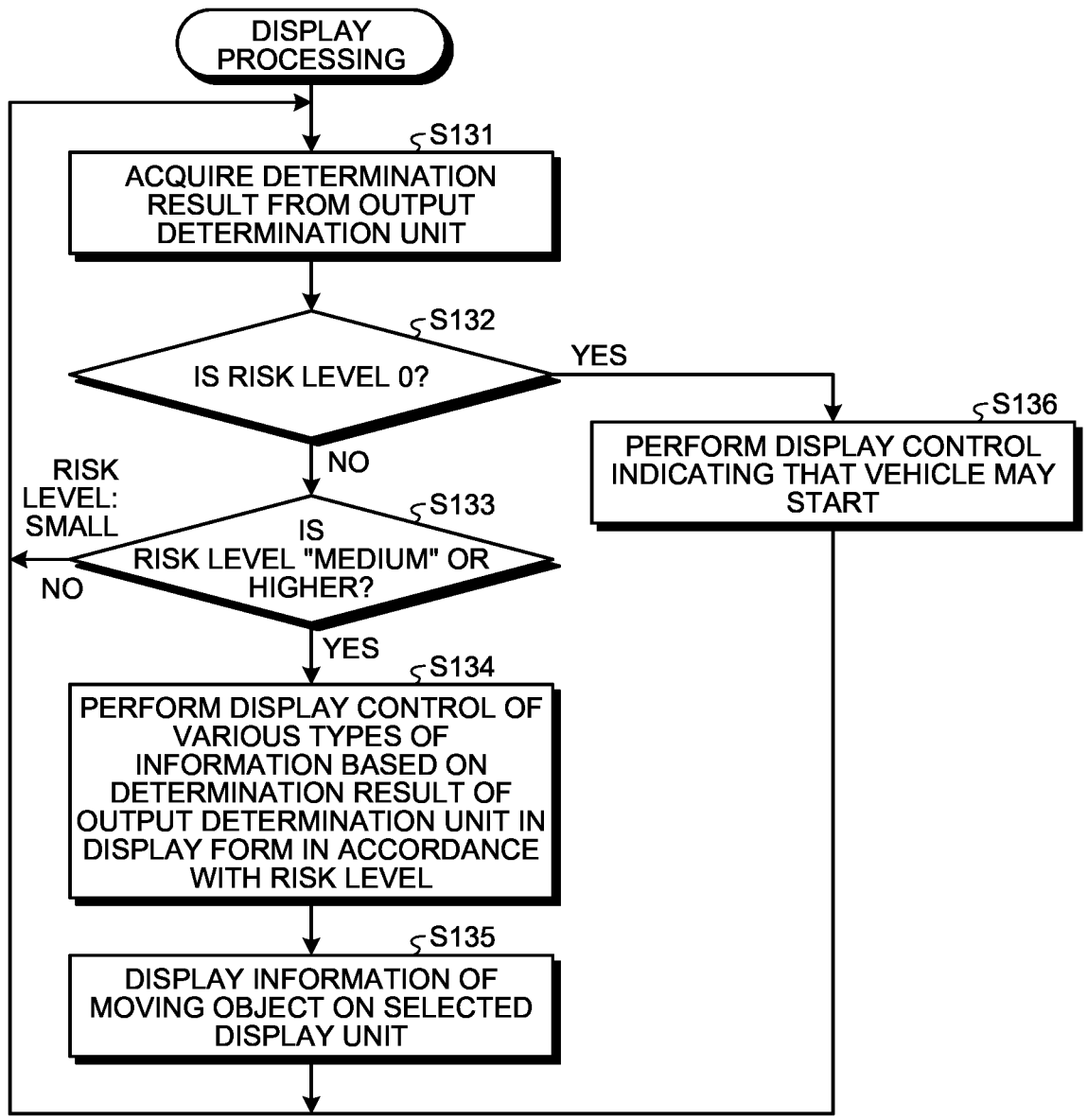
FIG. 18 is a flowchart illustrating a flow of display processing in the safety confirmation support processing of the safety confirmation support system according to the fifth modification.
Figure 21:
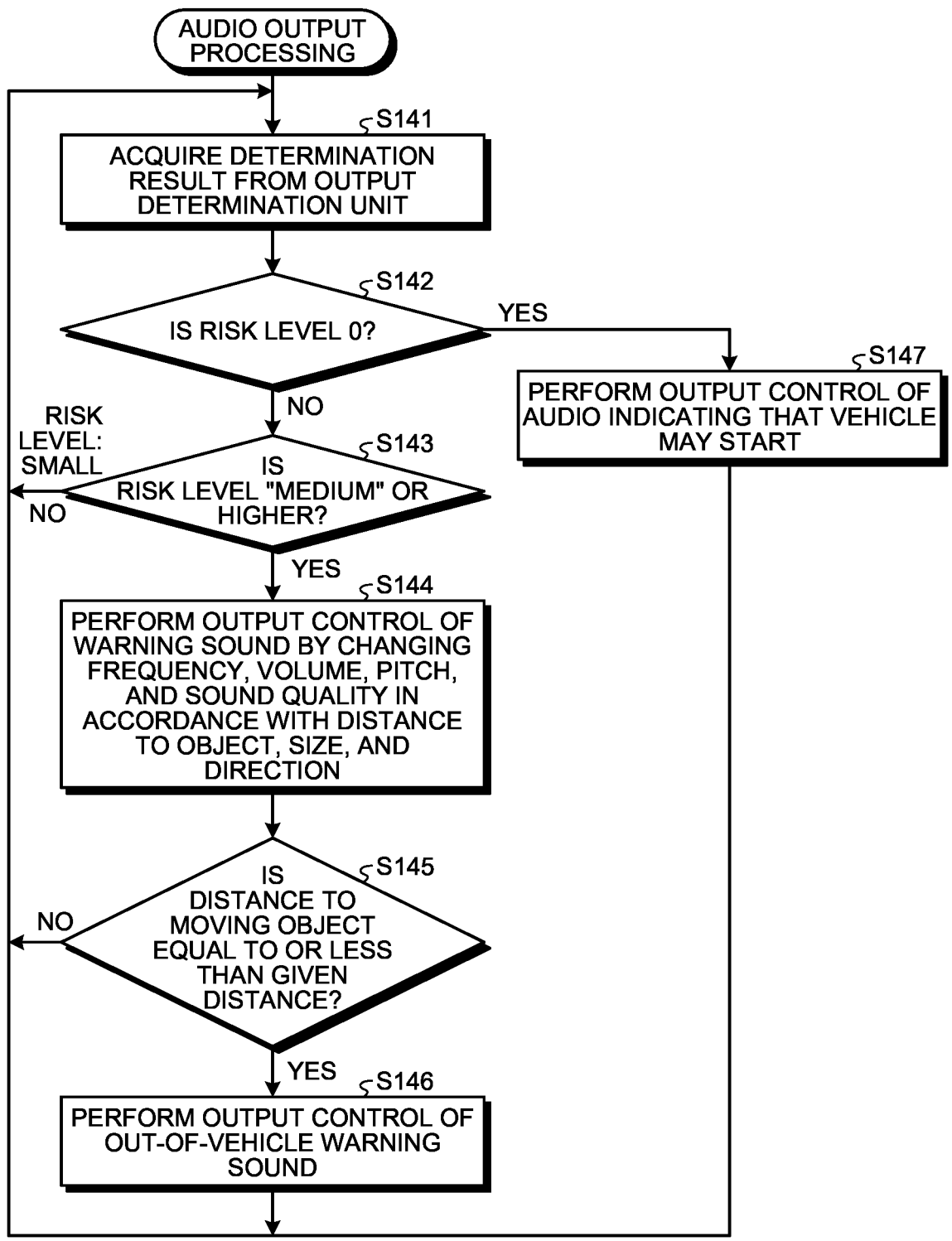
FIG. 21 is a flowchart illustrating a flow of audio output processing in the safety confirmation support processing of the safety confirmation support system according to the fifth modification.

Hereinafter, the safety confirmation support processing executed by the safety confirmation support system 10 according to the fifth modification will be described with reference to the flowcharts of FIGS. 17, 18, and 21. FIG. 17 is a flowchart for explaining mainly output determination processing of the output determination unit 41 in the safety confirmation support processing. FIG. 18 is a flowchart for explaining display processing of the output control unit 42 in the safety confirmation support processing. FIG. 21 is a flowchart for explaining audio output processing of the output control unit 42 in the safety confirmation support processing.

Output Determination Processing

First, in the flowchart of FIG. 17, when the safety confirmation support processing is started, the output determination unit 41 acquires the traveling speed (vehicle speed) of the vehicle 1 detected by the vehicle speed detection unit 21 (step S121). The output determination unit 41 determines, on the basis of the acquired traveling speed, whether or not the vehicle speed is currently equal to or lower than the predetermined speed (for example, 5 km/h) (step S122).

In the case of the safety confirmation support system 10 of the embodiment, the safety confirmation of the driver is supported mainly when the vehicle 1 is temporarily stopped or running at a low speed. Therefore, when the vehicle speed exceeds the predetermined speed (step S122: No), the safety confirmation support processing returns to step S121, and the safety confirmation support processing is in the standby state until the vehicle speed becomes equal to or lower than the predetermined speed.

Next, when the vehicle speed is equal to or lower than the predetermined speed (step S122: Yes), the output determination unit 41 acquires the detection output of the moving object from the moving object detection unit 20 (step S123), and determines the presence or absence of the moving object in the four detection areas Ta to Td around the vehicle 1 (step S124).

When no moving object is present in any of the detection areas Ta to Td (step S124: No), there is no possibility that the vehicle 1 will collide with a moving object, and there is no need to perform display control or audio output control of the moving object to be described later. Therefore, in step S129, the output determination unit 41 notifies the output control unit 42 of the determination result that the risk level is "0 (zero)", and returns the processing to step S121. The output control unit 42 notified of the determination result that the risk level is "0 (zero)" does not perform display control of the information about the moving object on the display unit 23, and also does not perform audio output control of the information about the moving object via the speaker unit 29.

On the other hand, when the moving object is present in the four detection areas Ta to Td around the vehicle 1 (step S124: Yes), the output determination unit 41 acquires the information indicating the direction of the driver's line of sight detected by the line-of-sight detection unit 31 (step S125). Then, in step S126, the output determination unit 41 calculates the overall risk level of each moving object on the basis of the type of each moving object present in each of the detection areas Ta to Td, the moving direction, the distance to the vehicle 1, and the driver's line of sight. Then, the output determination unit 41 notifies the output control unit 42 of the overall risk level.

The output determination unit 41 uses multiple parameters including, for example, a parameter indicating "whether or not the object is a moving object", a parameter indicating "a moving direction of the moving object", a parameter indicating "a distance to the vehicle 1", and a parameter indicating "a direction of the driver's line of sight". The output determination unit 41 determines the risk level of each moving object by using one or more of the multiple parameters.

Specifically, as exemplified below, each parameter is set with a value according to its risk level.
1. Parameter indicating whether the object is a moving object or a stationary object (e.g., moving object: risk level "10", stationary object: risk level "0")
2. Parameter indicating a type of the moving object (e.g., vehicle: risk level "20", bicycle: risk level "10", empty can: risk level "0")
3. Parameter indicating a moving direction (e.g., the moving object is moving in a direction approaching the vehicle 1: risk level "10", the moving object is moving in a direction away from the vehicle 1: risk level "0")
4. Parameter indicating a distance to vehicle 1 (e.g., long distance: risk level "0", medium distance: risk level "10", short distance: risk level "20")
5. Parameter indicating a driver's line of sight (e.g., the moving object is in the driver's field of view: risk level "0", the moving object is out of the driver's field of view: risk level "20")

The output determination unit 41 adds up the values of the parameter according to the risk level for each moving object. For example, it is assumed that, the object detected by the moving object detection unit 20 is a moving object (risk level "10"), the type of the moving object is a vehicle (risk level "20"), and the moving object is moving in a direction approaching the vehicle 1 (risk level "10"). In addition, it is assumed that, the distance to the vehicle 1 is short (risk level "20"), and the moving object is out of the driver's field of view (risk level "20"). The output determination unit 41 performs computing of adding each risk level and calculates the overall risk level. In this example, the output determination unit 41 performs computing processing of risk levels "10"+"20"+"10"+"20"+"20", and obtains "risk level 80" as the computing result.

When the sum value of the risk level is "0 to 30", the output determination unit 41 determines that the overall risk level of the moving object is "small". In addition, the output determination unit 41 determines that the overall risk level of the moving object is "medium" when the sum value is "31 to 60", and determines that the overall risk level of the moving object is "large" when the sum value is "61 to 100". In the above example, since the sum value is "risk level 80", the output determination unit 41 determines that the overall risk level for the moving object is "large" and notifies the output control unit 42 of the determination result (step S126).

Similarly, for example, it is assumed that the object detected by the moving object detection unit 20 is a moving object (risk level "10"), the type of the moving object is a bicycle (risk level "10"), and the moving object is moving in a direction away from the vehicle 1 (risk level "0"). In addition, it is assumed that the distance to the vehicle 1 is long (risk level "0") and the moving object is within the driver's field of view (risk level "0"). In the case of this example, the output determination unit 41 performs computing processing of risk levels "10"+"10"+"0"+"0"+"0", and obtains "risk level 20" as a computing result. Therefore, the output determination unit 41 determines that the overall risk level for the moving object is "small" and notifies the output control unit 42 of the determination result.

The risk level may be calculated by weighting, with predetermined coefficients, parameters such as the moving object, the moving direction, the distance to the vehicle, and driver's line of sight. Similarly, the determination threshold value of the risk level is also an example, and is not limited to this.

Next, the output determination unit 41 recognizes the direction of the driver's line of sight on the basis of the line-of-sight detection output from the line-of-sight detection unit 31. Then, the output determination unit 41 determines whether or not the moving object is out of the driver's field of view by comparing the recognized direction of the driver's line of sight with the direction in which the moving object is located (step S127). When the moving object is within the driver's field of view (step S127: No), the driver has already visually recognized the moving object, and it is not necessary to caution the driver with the information about the moving object. Therefore, the processing returns to step S121 without outputting the information about the moving object.

On the other hand, if the moving object is out of the driver's field of view (step S127: Yes), the driver may not be aware of the moving object. Therefore, in order to perform the caution with the information about the moving object, the output determination unit 41 notifies the output control unit 42 of the determination result (step S128). The determination result is, for example, the output destination selection information for selecting the display unit 23 and the speaker unit 29 corresponding to the detection area where the moving object has been detected, the calculated risk level, information indicating the overall risk level, or information indicating the distance between the moving object and the vehicle 1. Alternatively, in step S128, the output determination unit 41 may notify the output control unit 42 of the determination result such as the output destination selection information for selecting the display unit 23 within the driver's field of vision and the speaker unit 29, the calculated risk level, or information indicating the overall risk level. After the notification of the determination result is performed, the processing returns to step S121, and each of the above processing is repeatedly executed.

Display Processing

Next, the output control unit 42 performs display control of the information about the moving object on the display unit 23 and performs audio output control via the speaker unit 29, on the basis of the output destination selection information and the information indicating the overall risk level, which are included in the determination result given by the output determination unit 41. FIG. 18 is a flowchart illustrating a flow of display control of the information about the moving object.

In the flowchart of FIG. 18, when the determination result given by the output determination unit 41 is acquired in step S131, the output control unit 42 determines whether or not the risk level included in the determination result is "0 (zero)" (step S132). The risk level being "0 (zero)" (step S132: Yes) represents that the conditions around the vehicle 1 are safe. Therefore, the output control unit 42 performs display control of the information indicating that the vehicle 1 may start on the predetermined display unit 23 such as the front display unit 23C (step S136), and returns the processing to step S131.

As an example, the output control unit 42 controls the front display unit 23C to display characters "safe surroundings" as the information indicating that the vehicle 1 is allowed to start moving. As a result, it is possible to give to the driver the notification that the surroundings of the vehicle 1 are safe, and the driver can start the vehicle 1 after recognizing the safety around the vehicle 1.

Next, in response to determining, in step S132, that the risk level is not "0 (zero)" (step S132: No), the output control unit 42 determines whether the overall risk level is "medium" or higher, on the basis of the information indicating the overall risk level included in the determination result (step S133). When the overall risk level is "small" (step S133: No), it means that the conditions around the vehicle 1 are relatively safe such as the moving object present around the vehicle 1 moving away from the vehicle 1. Therefore, the output control unit 42 returns the processing to step S131 without displaying the information about the moving object on the display unit 23.

On the other hand, when the overall risk level is "medium" or higher (step S133: Yes), the output control unit 42 controls the display unit 23, which corresponds to the output destination selection information included in the determination result of the output determination unit 41, to display various types of information in a display form according to the risk level (step S134).

In addition, the output control unit 42 also controls the display unit 23 corresponding to the output destination selection information to display the information about the moving object (step S135), and returns the processing to step S131.

As described above, each of the display units 23L, 23R, 23C is associated with any of the detection areas Ta to Td, and the output control unit 42 performs display control of the information about the moving object on the display unit 23 associated with the detection area where the moving object has been detected.

Alternatively, as described above, the output control unit 42 may perform display control of the information about the moving object on the display unit 23 out of the display units 23L, 23R, and 23C, which is within the driver's field of view based on the driver's line of sight. In this case, when the direction in which the moving object is detected and the direction of the driver's line of sight match with each other, there is a high possibility that the driver is aware of the moving object. Therefore, the output control unit 42 may control such a display unit 23 not to display the information about the moving object.

FIG. 19 illustrates a specific display example for the display unit 23 illustrated in the output destination selection information. In FIG. 19, a scene (a) represents conditions around the vehicle 1. In the scene (a), the vehicle 1 has hit a T-junction and is about to turn to the right. At this time, a bicycle is approaching from the left side of the vehicle 1. In addition, an empty can is confirmed on the right side of the vehicle 1. In addition, on the right side of the vehicle 1, a bicycle traveling in a direction away from the vehicle 1 is confirmed.

In such a situation, the bicycle traveling from the left side of the vehicle 1 toward the vehicle 1 may collide with the vehicle 1 because it is approaching the vehicle 1. Therefore, the output determination unit 41 determines that the above-described overall risk level is "medium" or higher. On the other hand, the empty can is unlikely to collide with the vehicle 1. Therefore, the output determination unit 41 determines that the above-described overall risk level is "small". In addition, the bicycle traveling away from the vehicle 1 is unlikely to collide with the vehicle 1. Therefore, the output determination unit 41 determines that the above-described overall risk level is "small".

In FIG. 19, a display example (b) represents that information about the moving object corresponding to the foregoing determination results is displayed on the display unit 23 corresponding to the output destination selection information. When the above-described determination results are obtained, the output control unit 42 controls the display unit 23 to display an image of the vehicle 1 being the present vehicle. In addition, an image of the bicycle approaching from the left side of the vehicle 1 whose overall risk level has been determined to be "medium" or higher is displayed on the left side of the image of the vehicle 1. An image of the bicycle captured by the camera 12 can be used for the image of the bicycle approaching from the left side. Alternatively, for example, in the case of a bicycle or a motorcycle, an image of a two-wheeled vehicle prepared in advance and stored in the storage unit 28 may be displayed. In the case of an ordinary automobile or a freight vehicle, an image of a passenger is prepared in advance and stored in the storage unit 28 may be displayed On the other hand, the output control unit 42 controls the display unit 23 not to display (or controls it to hide) the images of the empty can and the bicycle moving in a direction away from the vehicle 1, each of whose overall risk level has been determined to be "small". That is, in the above situation, out of the three confirmed moving objects (the two bicycles and the empty can), the output control unit 42 controls the display unit 23 to display only the bicycle which is approaching from the left side of the vehicle 1 and whose overall risk level has been determined to be "medium" or higher.

As a result, for the vehicle 1, it is possible to call the driver's attention by displaying, on the display unit 23, only the moving object with a real risk of collision. Therefore, it is possible to prevent the inconvenience of rather causing confusion for the driver when the amount of information about the moving object displayed on the display unit 23 increases in a place where the traffic volume of vehicles is large, a place where there are many pedestrians, and the like.

Details of Display Form

Figure 20:
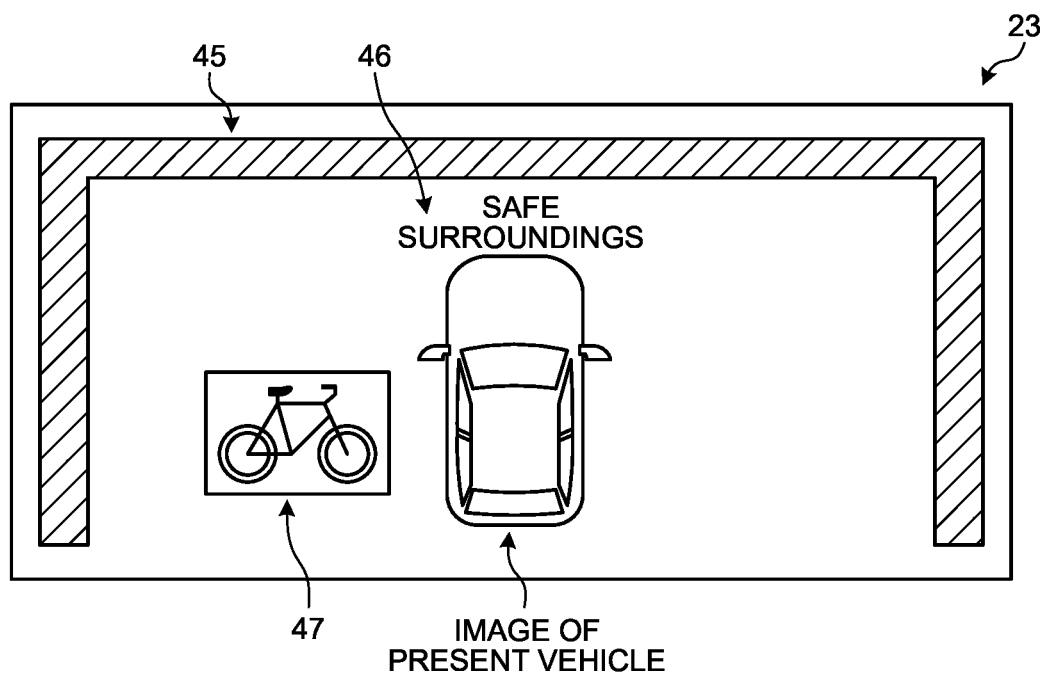
FIG. 20 is a diagram for explaining the display form of the information about the moving object for the display unit in the safety confirmation support system according to the fifth modification.

Next, FIG. 20 is a diagram for explaining the details of the display form for the display unit 23 by the output control unit 42. When displaying information about a moving object, the output control unit 42 controls the display unit 23 to display each object in a display form according to the risk level of the moving object (distance, size, and direction of the moving object).

Specifically, in a case where the output determination unit 41 obtains determination result that the risk level is "0 (zero)" while the vehicle 1 is stopped (or traveling at an extremely low speed) (step S132 in FIG. 18), the output control unit 42 controls the display unit 23 to display an object 46 of characters "safe surroundings" as illustrated in FIG. 20 (step S136 in FIG. 18). This makes it possible to inform the driver that the surroundings of the vehicle 1 are safe. The driver may also be informed of the safety of the surroundings by controlling the lighting or blinking of the light emitting diode or the like provided on the back surface of a plate such as a plastic member on which the characters such as "safe surroundings" are written.

If the risk level is not "0 (zero)", the output control unit 42 controls the display unit 23 not to display the characters "safe surroundings". In addition, characters or a message that can restrain the vehicle 1 from starting to move may be displayed, for example, "waiting for start" or "moving object is approaching". As a result, it is possible to prevent the inconvenience of starting the vehicle 1 despite the risk of collision.

In addition, when displaying the moving object, the output control unit 42 adds a detection frame 47 surrounding the moving object to be displayed. In FIG. 20, the detection frame 47 is added to an image of a bicycle as a moving object. The output control unit 42 gradually changes the color of the detection frame 47 in accordance with the distance from the vehicle 1, for example, in an order of blue (away by a predetermined distance or more), yellow (approaching by about a medium distance), and red (approaching by a predetermined distance or less). As a result, it is possible to notify the driver of the state in which the moving object is approaching and the distance to the moving object.

The output control unit 42 may change the color of the image itself of the moving object in the order of blue, yellow, and red as described above without displaying the detection frame 47. In addition, the detection frame 47 and the moving object may be displayed in other colors. In addition, the detection frame 47 and the moving object may be lit or blinked. When the detection frame 47 and the moving object are lit and displayed, the blinking speed may be changed in a manner that the blinking speed increases as the moving object approaches the vehicle 1 (in accordance with the distance). As a result, it is possible to further call the driver's attention to the moving object.

In addition, the output control unit 42 may display at least an image of the moving object as an animation in accordance with the moving distance of the detected moving object. In this case, it is possible to visually express how the bicycle or the like gradually approaches the vehicle 1, and it is possible to further call the driver's attention.

In addition, as the moving object approaches the vehicle 1, the image of the moving object may be changed and displayed to become larger. That is, the size of the image of the moving object may be changed in accordance with the distance. In addition, as the moving object approaches the vehicle 1, the image of the moving object and/or the detection frame 47 may be changed and displayed to be gradually lowered in transparency. When changing the transparency of the image of the moving object and/or the detection frame 47, the output control unit 42 displays the image of the moving object and/or the detection frame 47 lightly when the distance from the vehicle 1 is large (high transparency). Then, as the moving object approaches the vehicle 1, the image of the moving object and/or the detection frame 47 are gradually displayed darker (in an order of medium transparency, low transparency, and zero transparency). As a result, the visibility of the moving object can be gradually increased in accordance with the distance from the vehicle 1, and the driver's attention to the moving object can be gradually increased.

In addition, as illustrated in FIG. 20, the output control unit 42 displays a display unit frame 45 that surrounds the display unit 23 as a whole. Then, the output control unit 42 changes the color of the display unit frame 45 in accordance with the distance between the vehicle 1 and the moving object. Specifically, the output control unit 42 changes the color of the display unit frame 45 in the order of, for example, blue, yellow, and red as the distance between the vehicle 1 and the moving object becomes shorter. As a result, it is possible to further call the driver's attention to the moving object. The color used to display the display unit frame 45 may be arbitrary.

In addition, the transparency of the display unit frame 45 may be converted in accordance with the distance between the vehicle 1 and the moving object as described above, and in addition to lighting display, blinking display in accordance with the distance between the vehicle 1 and the moving object may be performed.

The display form described above can be arbitrarily set for a safety confirmation device 26 via the operation unit. As a result, the driver can monitor the moving object around the vehicle 1 in a desired display form.

Audio Output Processing

Next, in the safety confirmation support system 10 according to the fifth modification, predetermined audio output processing is performed in addition to the display processing in order to caution the driver to visually and auditory know the presence of the moving object around the vehicle 1.

FIG. 21 is a flowchart illustrating a flow of audio output processing of the information about the moving object. In the flowchart of FIG. 21, when the determination result given by the output determination unit 41 is acquired in step S141, the output control unit 42 determines whether or not the risk level included in the determination result is "0 (zero) (step S142). The risk level being "0 (zero) (step S142: Yes) represents that the conditions around vehicle 1 are safe. In this case, the output control unit 42 controls the predetermined speaker unit 29, such as the front speaker unit 29C provided in the center of the dashboard 4, to output audio indicating that the vehicle 1 may start, and returns the processing to step S141.

As an example, the output control unit 42 performs output control on the speaker unit 29 to output an audio message, such as "the surroundings are safe", as information indicating that the vehicle 1 may start. As a result, it is possible to inform the driver that the surroundings of the vehicle 1 are safe, and the driver can start the vehicle 1 after recognizing the safety around the vehicle 1.

Next, in response to determining, in step S142, that the risk level is not "0 (zero)" (step S142: No), the output control unit 42 determines whether or not the overall risk level is "medium" or higher, on the basis of the information indicating the overall risk level, which is included in the determination result (step S143). When the overall risk level is "small" (step S143: No), it means that the conditions around the vehicle 1 are relatively safe such as a situation that the moving object present around the vehicle 1 is moving away from the vehicle 1. Therefore, the output control unit 42 returns the processing to step S141 without performing output control of the audio of the information about the moving object.

On the other hand, when the overall risk level is "medium" or higher (step S143: Yes), the output control unit 42 controls the speaker unit 29 to output audio of the information about the moving object (step S144). This speaker unit 29 is indicated by the output destination selection information, which is included in the determination result of the output determination unit 41.

Each of the speaker units 29L, 29R, 29C is associated with any of the detection areas Ta to Td, and the output control unit 42 performs output control of the information about the moving object via the speaker unit 29 associated with the detection where the moving object has been detected.

Alternatively, the output control unit 42 performs output control of the information about the moving object by using the speaker unit 29 out of the speaker units 29L, 29R, and 29C, which is within the driver's field of view detected based on the driver's line of sight. In this case, when the direction in which the moving object is detected and the direction of the driver's line of sight match with each other, there is a high possibility that the driver is aware of the moving object. Therefore, the output control unit 42 does not have to perform output control of the information about the moving object.

The audio of the information about the moving object may be a predetermined electronic sound, or may be a voice message that calls the driver's attention, such as "a moving object is approaching", for example. In addition, the output control of audio is performed by changing volume, pitch, sound quality, or the like in accordance with the distance between the moving object and the vehicle 1, the size of the moving object, the moving direction of the moving object, or the like.

For example, the output control unit 42 increases frequency of audio output (that is, shortens the output interval), increases the volume, and raises the pitch as the moving object approaches the vehicle 1. With this control, the approaching condition of the moving object can be recognized through the driver's hearing. One or any two of the output frequency, volume, and pitch may be controlled.

In addition, the output control unit 42 may control the speaker units 29L, 29R, and 29C to output different types of warning sounds or voice messages. In this case, the driver can be more careful because he/she can recognize the approaching direction of the moving object on the basis of the type of audio heard.

Next, the output control unit 42 determines whether or not the distance between the moving object and the vehicle 1 has become equal to or less than a given distance, on the basis of the information indicating the distance between the moving object and the vehicle 1, which is included in the determination result of the output determination unit 41 (step S145). In response to determining that the distance between the moving object and the vehicle 1 has not become equal to or less than a given distance (step S145: No), the processing returns to step S141, and the processing from step S141 is repeatedly executed.

On the other hand, when the distance between the moving object and the vehicle 1 has become equal to or less than a given distance (step S145: Yes), the output control unit 42 performs output control of an out-of-vehicle warning sound (voice message or horn) dedicated for the vehicle 1 (step S146).

specifically, when the distance between the moving object and the vehicle 1 has become equal to or less than a given distance, it is necessary to call attention not only to the driver but also to a person who drives the moving object. Therefore, in step S144, the driver of the vehicle 1 is cautioned by a warning sound or the like until the distance between the moving object and the vehicle 1 becomes equal to or less than a given distance. Then, when the distance between the moving object and the vehicle 1 has become equal to or less than a given distance, an out-of-vehicle warning sound is output in step S145 to alert the person who drives the moving object. As a result, both the driver of the vehicle 1 and the person who drives the moving object can be alerted via audio to prevent a collision.

FIG. 22 is a diagram illustrating an example of an audio output form performed via the speaker unit 29 illustrated in the output destination selection information. In FIG. 22, a scene (a) represents the same situation as described in the scene (a) in FIG. 19, where a bicycle is approaching from the left side of the vehicle 1, an empty can is present on the right side of the vehicle 1, and a bicycle moving away from the vehicle 1 is present on the right side of the vehicle 1.

In such a situation, the bicycle traveling from the left side of the vehicle 1 toward the vehicle 1 may collide with the vehicle 1 because it is approaching the vehicle 1. Therefore, the output determination unit 41 determines that the above-described overall risk level is "medium" or higher. On the other hand, the empty can is unlikely to collide with the vehicle 1, so that the output determination unit 41 determines that the above-described overall risk level is "small". In addition, the bicycle traveling away from vehicle 1 is unlikely to collide with the vehicle 1. Therefore, the output determination unit 41 determines that the above-described overall risk level is "small".

As illustrated in an example of audio output (b) in FIG. 22, the output control unit 42 controls the left speaker unit 29L to output a warning sound or a voice message to a bicycle approaching from the left side of the vehicle 1 whose overall risk level has been determined to be "medium" or higher. Since the driver of the vehicle 1 can hear the audio from the left speaker unit 29L, he/she can recognize that the moving object is approaching from the left side of the vehicle 1 and can be careful. If the moving object is approaching from the right side of the vehicle 1, the output control unit 42 controls the right speaker unit 29R to output a warning sound or the like. Moreover, if the moving object is head-on approaching the vehicle 1, the output control unit 42 controls the front speaker unit 29C to output a warning sound or the like.

On the other hand, the output control unit 42 controls the speaker unit 29 not to output the audio to the empty can and the bicycle moving in a direction away from the vehicle 1, each of whose overall risk level has been determined to be "small". Specifically, in the above situation, out of the three confirmed moving objects (the two bicycles and the empty can), the output control unit 42 performs audio output control only for the bicycle approaching the vehicle 1 whose overall risk level has been determined to be "medium" or higher.

As a result, the vehicle 1 is able to call the driver's attention by performing the audio output control only for the moving object that is determined to cause a real risk of collision. Therefore, it is possible to prevent the inconvenience of rather causing confusion for the driver when output control of a warning sound or the like is performed frequently in a place where the traffic volume of vehicles is large, a place where there are many pedestrians, and the like.

Advantage of Fifth Modification

As is clear from the above description, the safety confirmation support system 10 according to the fifth modification selects, from among the objects (moving objects and stationary objects) present around the vehicle 1, only moving objects with a high risk affecting the vehicle 1 and performs display control and audio output control with respect to those moving object. As a result, it is possible to prevent the inconvenience of rather causing confusion for the driver when display control and output control of a warning sound or the like is performed frequently in a place where the traffic volume of vehicles is large, a place where there are many pedestrians, and the like.

In the safety confirmation support system 10 according to the fifth modification described above, the output control of the information about the moving object is performed via both the display unit 23 and the speaker unit 29. The output control of the information about the moving object may be performed via either the display unit 23 or the speaker unit 29. In this case as well, the same advantage as described above can be obtained.

In addition, the safety confirmation support system 10 according to the fifth modification described above is provided with the display units 23 and the speaker units 29, whereas only one of the display units 23 or one of the speaker units 29 may be provided. In this case, output control of the information about the moving object may be performed on the provided one unit. Even in this case, the same advantage as described above can be obtained.

Although the embodiments of the present disclosure have been described above, these embodiments are examples and are not intended to limit the scope of the invention. These embodiments can be implemented in various other forms, and various omissions, replacements, and changes can be made without departing from the gist of the invention.

Figure 14:
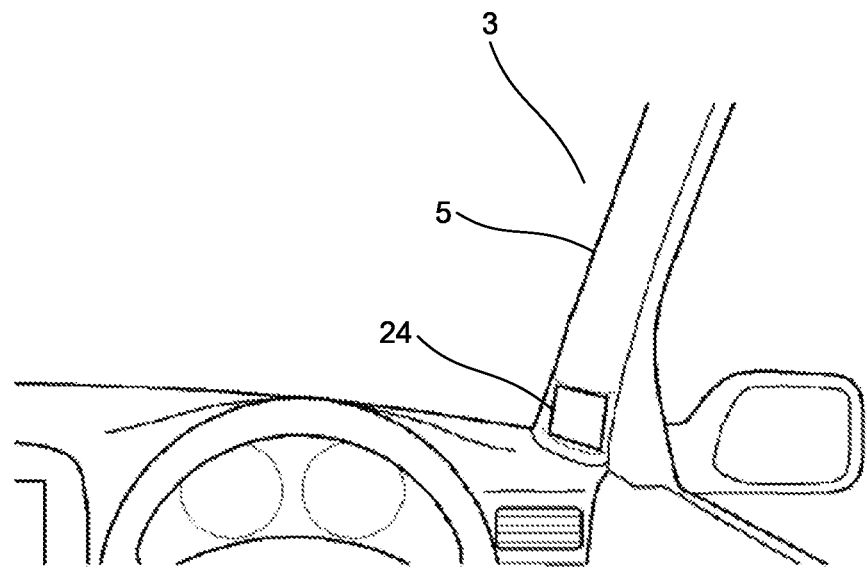
FIG. 14 is a diagram illustrating an example in which the display unit is provided on left and right A pillars.
Figure 15:
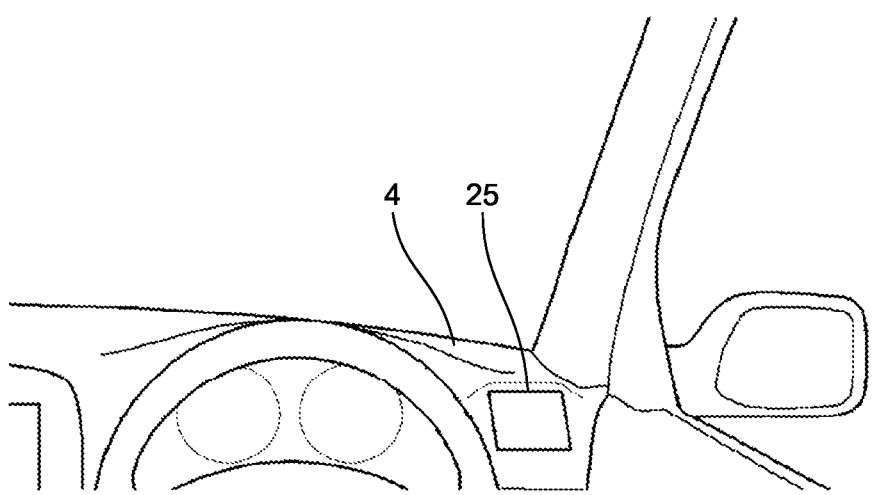
FIG. 15 is a diagram illustrating an example in which the display unit is provided on left and right ends of a dashboard.

For example, in the above-described embodiment, while the display unit 23 includes a head-up display device, any display unit may be used as long as the information of the moving object can be displayed. As an example, as illustrated in FIG. 14, a display unit 24 such as a liquid crystal display unit is provided inside the vehicle on window pillars (so-called A pillars) 5 on both left and right sides of the windshield 3 with the display screen facing the driver. Alternatively, as illustrated in FIG. 15, a display unit 25 such as a liquid crystal display unit may be provided on the left and right ends of the dashboard 4 with the display screen facing the driver.

In addition, in the above-described embodiment, the information of the moving object is displayed on the three display units 23L, 23C, and 23R. However, the information of the moving object may be displayed at any position on the windshield. When the driver's line of sight is detected as in the fourth modification, the information of the moving object may be displayed as a virtual image in a predetermined range around the detected line of sight.

In addition, the association between the display units 23L, 23C, and 23R and the detection areas Ta to Td may be as follows. That is, for example, the driver who is gazing to the direction in which the right display unit 23R enters the field of vision cannot see the left side (third detection area Tc) of the vehicle 1. Therefore, the third detection area Tc may be associated with the right display unit 23R, and the information of the moving object detected in the third detection area Tc may be displayed on the right display unit 23R.

In addition, the driver, who is gazing to the direction in which the left display unit 23L enters the field of vision, cannot see the left side (third detection area Tc) and the right side (fourth detection area Td) of the vehicle 1. Therefore, it is preferable that the third detection area Tc and the fourth detection area Td are associated with the left display unit 23L. In this case, the information of the moving object detected in the third detection area Tc or the fourth detection area Td may be displayed on the left display unit 23L. The information of the moving object may be displayed on all the display units 23L, 23C, and 23R, instead of displaying the information of the moving object on one selected display out of the display units 23L, 23C, and 23R.

The embodiments and modifications described above are included in the scope and gist of the invention, as well as in the scope of the invention described in the claims and the equivalent scope.

1 Vehicle
2 Side Mirror
3 Front Glass
4 Dashboard
5A Pillar
10 Safety Confirmation Support System
11 Radar
12 Camera
20 Moving Object Detection Unit
21 Vehicle Speed Detection Unit
22 Display Control Unit
23 Display Unit
23L Left Display Unit
23R Right Display Unit
23C Front Display Unit
26 Safety Driving Support System
27 CPU
28 Storage Unit
29 Speaker Unit
29L Left Speaker Unit
29R Right Speaker Unit
29C Front Speaker Unit
30 Driver Use Oriented Camera
31 Light of Sight Detection Unit
41 Output Judgement Unit
42 Output Control Unit

What is claimed:
1. A safety confirmation support device comprising:
one or more output devices; and
a hardware processor connected to the one or more output devices, the hardware processor being configured to
detect at least one object in a detection area around a vehicle,
determine, for each detected object, a risk level indicating a level of risk affecting the vehicle for each of multiple parameters,
determine, for each detected object, an overall risk level by adding the risk level for each of the multiple parameters, and
perform, for each detected object, output control to output information about the detected object via the one or more output devices when the overall risk level of the detected object is equal to or higher than a predetermined threshold value, and not to output the information about the detected object when the overall risk level is below the threshold value.

2. The safety confirmation support device according to claim 1, wherein the multiple parameters include
a first parameter indicating whether or not the detected object is a moving object,
a second parameter indicating a moving direction of the moving object,
a third parameter indicating a distance between the moving object and the vehicle, and
a fourth parameter indicating a direction of a line of sight of a driver of the vehicle.

3. The safety confirmation support device according to claim 2, wherein the hardware processor is configured to determine the overall risk level of each detected object as "large", "medium", and "small" on a basis of a sum value resulting from adding a predetermined value attached to the multiple parameters.

4. The safety confirmation support device according to claim 1, wherein the hardware processor is configured to change an output form in accordance with the overall risk level when performing the output control of the information about each detected object.

5. The safety confirmation support device according to claim 1, wherein
the one or more output devices include a display device and an audio output device, and
the hardware processor is configured to perform the output control of the information about each detected object via at least one of the display device or the audio output device.

6. The safety confirmation support device according to claim 1, wherein
the one or more output devices are provided at different positions in the vehicle, and
the hardware processor is configured to perform the output control of the information about each detected object via an output device out of the one or more output devices, which is associated with the detection area where each detected object has been detected.

7. The safety confirmation support device according to claim 1, further comprising:
a line-of-sight detection device configured to detect a line-of-sight of a driver of the vehicle, wherein
the one or more output devices are provided at different positions in the vehicle, and
the hardware processor is configured to perform the output control of the information about each detected object via an output device out of the one or more output devices, which corresponds to a field of view based on a line-of-sight of the driver detected by the line-of-sight detection device.

8. The safety confirmation support device according to claim 7, wherein the hardware processor is configured to perform the output control not to output the information about the detected object when the hardware processor determines that the detected object is within the field of view of the driver on a basis of the line-of-sight of the driver detected by the line-of-sight detection device.

9. The safety confirmation support device according to claim 1, wherein the multiple parameters include
a first parameter indicating whether or not the detected object is a moving object,
a second parameter indicating a type of the moving object,
a third parameter indicating a moving direction of the moving object,
a fourth parameter indicating a distance between the moving object and the vehicle, and
a fifth parameter indicating a direction of a line of sight of a driver of the vehicle.

10. A safety confirmation support method comprising:
detecting at least one object in a detection area around a vehicle;
determining, for each detected object, a risk level indicating a level of risk affecting the vehicle for each of multiple parameters;
determining, for each detected object, an overall risk level by adding the risk level for each of the multiple parameters; and
performing, for each detected object, output control to output information about the detected object via one or more output devices when the overall risk level of the detected object is equal to or higher than a predetermined threshold value, and not to output the information about the detected object when the overall risk level is below the threshold value.

11. A non-transitory computer-readable recording medium on which executable instructions are recorded, the executable instructions causing a computer to:
detect at least one object in a detection area around a vehicle;
determine, for each detected object, a risk level indicating a level of risk affecting the vehicle for each of multiple parameters;
determine, for each detected object, an overall risk level by adding the risk level for each of the multiple parameters; and
perform, for each detected object, output control to output information about the detected object via one or more output devices when the overall risk level of the detected object is equal to or higher than a predetermined threshold value, and not to output the information about the detected object when the overall risk level is below the threshold value.

* * * * *